(12) United States Patent
Sandhan et al.

(10) Patent No.: US 10,909,420 B2
(45) Date of Patent: Feb. 2, 2021

(54) METHOD AND APPARATUS FOR CONTINUOUSLY DISPLAYING IMAGES ON BASIS OF SIMILARITY OF IMAGES

(71) Applicant: Samsung Electronics Co., Ltd., Gyeonggi-do (KR)

(72) Inventors: Tushar Balasaheb Sandhan, Gyeonggi-do (KR); Dae Kyu Shin, Gyeonggi-do (KR); Hee Kuk Lee, Gyeonggi-do (KR); Ju Woan Yoo, Gyeonggi-do (KR); Seo Young Lee, Gyeonggi-do (KR); Yu Min Jung, Gyeonggi-do (KR); Ji Yoon Park, Gyeonggi-do (KR); Jung Eun Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 47 days.

(21) Appl. No.: 16/320,553

(22) PCT Filed: Jul. 7, 2017

(86) PCT No.: PCT/KR2017/007333
§ 371 (c)(1),
(2) Date: Jan. 25, 2019

(87) PCT Pub. No.: WO2018/021723
PCT Pub. Date: Feb. 1, 2018

(65) Prior Publication Data
US 2019/0251394 A1   Aug. 15, 2019

(30) Foreign Application Priority Data
Jul. 29, 2016   (KR) .......................... 10-2016-0097366

(51) Int. Cl.
*G06K 9/00* (2006.01)
*G06K 9/62* (2006.01)
(Continued)

(52) U.S. Cl.
CPC ....... *G06K 9/6255* (2013.01); *G06K 9/00677* (2013.01); *G06K 9/6807* (2013.01);
(Continued)

(58) Field of Classification Search
CPC ..... G11B 27/031; G11B 27/034; G11B 27/10; G11B 27/34; G11B 27/105; G06F 3/0482;
(Continued)

(56) References Cited

U.S. PATENT DOCUMENTS 5,778,108 A * 7/1998 Coleman, Jr. .......... H04N 19/87
   348/700
7,796,779 B1 * 9/2010 Strong ............... H04N 1/32106
   382/100
(Continued)

FOREIGN PATENT DOCUMENTS

EP   2 741 292 A1   6/2014
EP   2741293 A1    6/2014
(Continued)

OTHER PUBLICATIONS

European Search Report dated Jun. 5, 2019.
Indian Search Report dated Dec. 15, 2020.

*Primary Examiner* — Ian L Lemieux
(74) *Attorney, Agent, or Firm* — Cha & Reiter LLC.

(57) ABSTRACT

Various embodiments of the present disclosure may store instructions to perform image recognition for a plurality of images, calculate similarity between the plurality of images, based at least partially on a result of the image recognition, create a group including at least two images of the plurality of images, based at least partially on the calculated similarity, determine a sequence for displaying, the at least two images included in the group, based at least partially on similarity between the at least two images included in the group, and output the at least two images onto the display in the sequence. In addition, various other embodiments are possible.

15 Claims, 20 Drawing Sheets

(51) Int. Cl.
*G06K 9/68* (2006.01)
*G06T 7/32* (2017.01)
*G06T 7/33* (2017.01)
*G06T 7/269* (2017.01)

(52) U.S. Cl.
CPC ............... *G06T 7/269* (2017.01); *G06T 7/32* (2017.01); *G06T 7/33* (2017.01)

(58) Field of Classification Search
CPC ............ G06K 9/00677; G06K 9/6255; G06K 9/6807; G06T 7/269; G06T 7/32; G06T 7/33; G09G 2340/10; G09G 5/377; H04N 21/47205
See application file for complete search history.

(56) References Cited

U.S. PATENT DOCUMENTS

| | | | |
|---|---|---|---|
| 8,135,222 B2 | 3/2012 | Bressan | |
| 8,957,915 B1 | 2/2015 | Chalasani et al. | |
| 9,560,414 B1 | 1/2017 | Chalasani et al. | |
| 9,626,076 B2 | 4/2017 | Lee et al. | |
| 9,743,042 B1* | 8/2017 | Faulkner | H04N 7/15 |
| 2010/0027959 A1* | 2/2010 | Obama | H04N 5/765 |
| | | | 386/278 |
| 2011/0044549 A1 | 2/2011 | Bressan | |
| 2011/0080424 A1 | 4/2011 | Peters et al. | |
| 2012/0210232 A1* | 8/2012 | Wang | G11B 27/34 |
| | | | 715/723 |
| 2013/0216206 A1* | 8/2013 | Dubin | H04N 7/155 |
| | | | 386/282 |
| 2014/0153900 A1 | 6/2014 | Tanaka | |
| 2014/0164931 A1 | 6/2014 | Lee et al. | |
| 2015/0071613 A1* | 3/2015 | Dharssi | H04N 21/812 |
| | | | 386/278 |
| 2016/0358634 A1* | 12/2016 | Molgaard | H04N 5/23229 |
| 2017/0026610 A1* | 1/2017 | Kwon | H04N 5/772 |
| 2018/0233174 A1* | 8/2018 | Nakagawa | G11B 27/34 |
| 2020/0312369 A1* | 10/2020 | Hoshika | G11B 27/031 |

FOREIGN PATENT DOCUMENTS

| | | |
|---|---|---|
| JP | 5507386 B2 | 5/2014 |
| KR | 10-2008-0089722 A | 10/2008 |
| KR | 10-2010-0131295 A | 12/2010 |
| KR | 10-2011-0043612 A | 4/2011 |
| KR | 10-2014-0073327 A | 6/2014 |

* cited by examiner

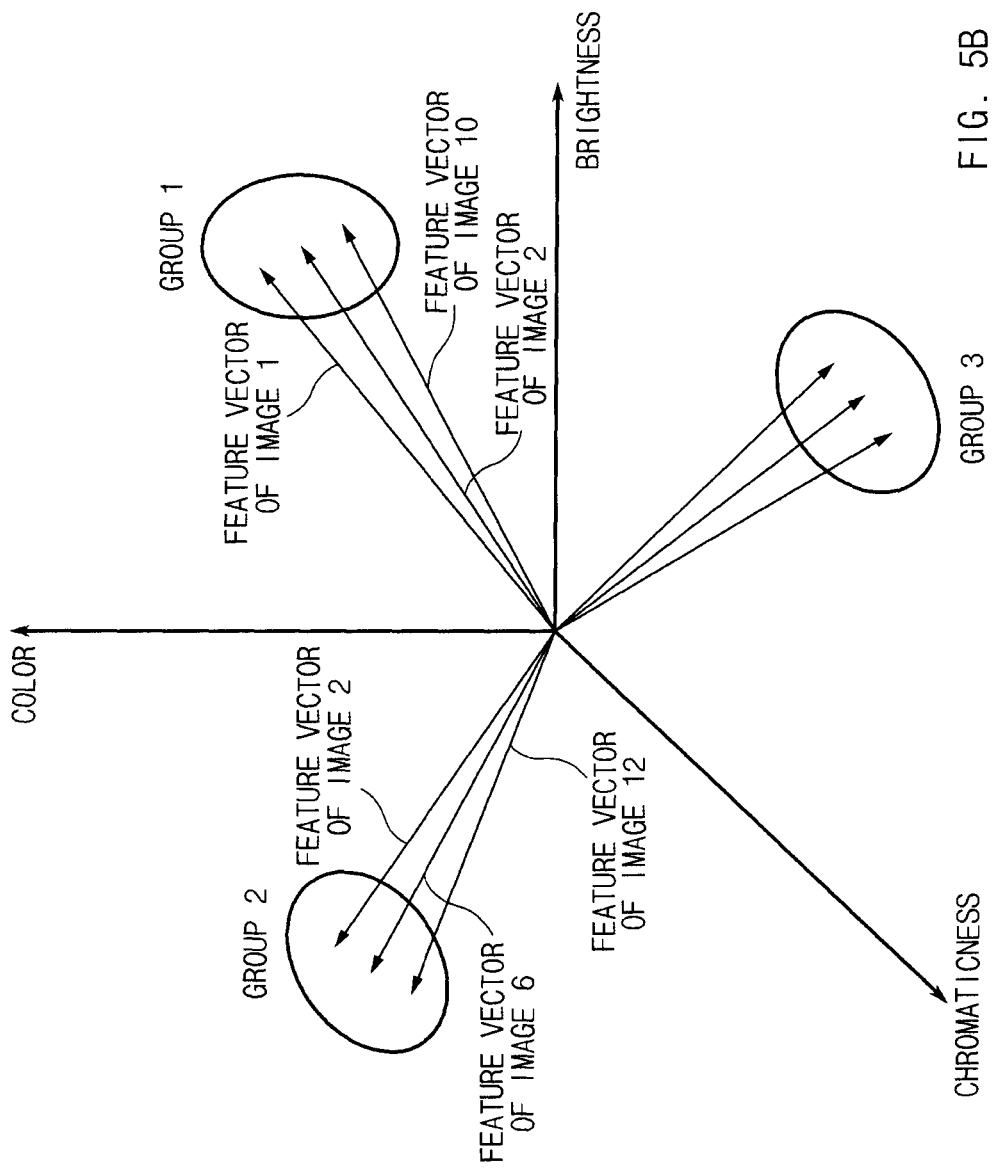

METHOD AND APPARATUS FOR CONTINUOUSLY DISPLAYING IMAGES ON BASIS OF SIMILARITY OF IMAGES

CLAIM OF PRIORITY

This application is a National Phase Entry of PCT International Application No. PCT/KR2017/007333, which was filed on Jul. 7, 2017 and claims a priority to Korean Patent Application No. 10-2016-0097366, which was filed on Jul. 29, 2016, the contents of which are incorporated herein by reference.

TECHNICAL FIELD

Various embodiments of the present disclosure relate to a technology of continuously displaying images on a display.

BACKGROUND ART

With the development of mobile communication technologies, an electronic device, which is equipped with a display, such as a smartphone, a wearable device, or the like, has been widely supplied. Such an electronic device may perform various functions, such as taking a photo or a moving picture, reproducing a music file or a moving picture file, playing a game, web-browsing, through a display.

The electronic device may continuously display images on the display in addition to the functions described above. For example, the electronic device may display images stored in a memory sequentially (e.g., a slide show). As another example, the electronic device may sort images stored in the memory based on a specific criteria (e.g., shooting time, filename, or the like) and generate an image file, such as a GIF format, based on the sorted images. Through such a method, the electronic device may continuously connect the still images stored in a terminal to exhibit an effect of moving objects in the images.

DISCLOSURE

Technical Problem

However, when images are displayed continuously, the movement of the objects included in the images may not be smoothly connected. For example, since the positions, compositions, sizes, and the like of the objects included in the images are different from each other, the movement of the object may look temporally/spatially disconnected or strangely connected.

Various embodiments of the present disclosure provide a method and an apparatus for continuously displaying images based on similarity of the images to solve problems described above and issued in the present disclosure.

Technical Solution

According to various embodiments, an electronic device may include a housing, a display exposed through a portion of the housing, a camera device disposed at another portion of the housing, a wireless communication circuit included in the housing, a processor disposed in the housing and electrically connected with the display, the camera device, and the wireless communication circuit, and a memory provided in the housing and electrically connected with the processor. The memory may be configured to store a plurality of images obtained through the camera device and/or the wireless communication circuit. The memory may store instructions that, when executed, cause the processor to perform image recognition for the plurality of images, calculate similarity between the plurality of images, based at least partially on a result of the image recognition, create a group including at least two images of the plurality of images, based at least partially on the calculated similarity, determine a sequence for displaying, based at least partially on similarity between the at least two images included in the group, and display the at least two images onto the display in the sequence.

According to various embodiments of the present disclosure, an electronic device may include a housing, a display exposed through a portion of the housing, a camera device disposed at another portion of the housing, a wireless communication circuit included in the housing, a processor disposed in the housing and electrically connected with the display, the camera device, and the wireless communication circuit, and a memory provided in the housing and electrically connected with the processor. The memory may be configured to store a plurality of images obtained through the camera device and/or the wireless communication circuit. The memory may store instructions that, when executed, cause the processor to perform image recognition for the plurality of images, calculate similarity between the plurality of images, based at least partially on a result of the image recognition, create a group including at least two images of the plurality of images, based at least partially on the calculated similarity, determine the sequence for the displaying, which is at least partially different form a sequence of times included in metadata of the images, and display the at least two images onto the display in the sequence.

According to various embodiments of the present disclosure, a method may include performing image recognition for a plurality of images, calculating similarity between the plurality of images, based at least partially on a result of the image recognition, creating a group including at least two images of the plurality of images, based at least partially on the calculated similarity, determining a sequence for displaying based at least partially on the similarity between the at least two images included in the group, and displaying the at least two images onto the display, in the sequence.

Advantageous Effects

According to various embodiments of the present disclosure, the images may be continuously and smoothly reproduced and displayed.

According to various embodiments of the present disclosure, the utilization of images captured on the terminal may be improved and the experience of the user may be increased. Besides, a variety of effects directly or indirectly understood through the present disclosure may be provided.

DESCRIPTION OF DRAWINGS

FIG. 5B illustrates that the electronic device groups a plurality of images based on feature vectors, according to an embodiment;

MODE FOR INVENTION

Figure 1:
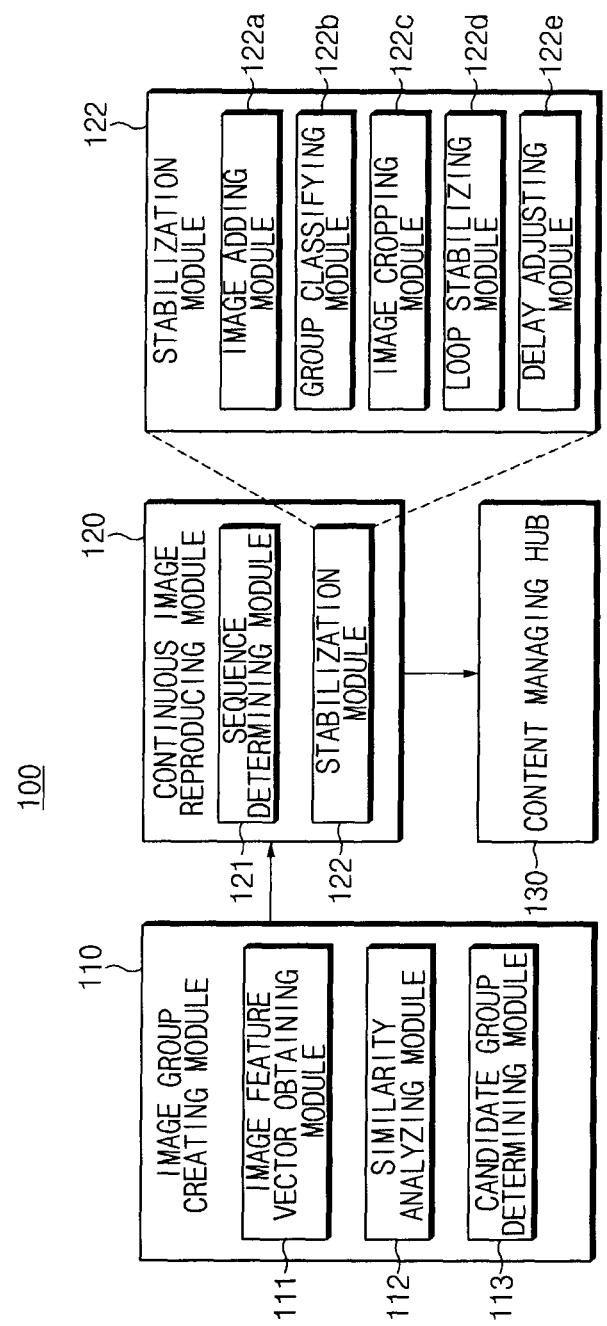
FIG. 1 illustrates an electronic device, according to an embodiment.

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals.

In the present disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the present disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the present disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the present disclosure, a first component may be referred to as a second component, and similarly, a second component may be referred to as a first component.

It will be understood that when an component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when an component (e.g., a first component) is referred to as being "directly coupled with/to" or "directly connected to" another component (e.g., a second component), it should be understood that there are no intervening component (e.g., a third component).

According to the situation, the expression "configured to" used in the present disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the present disclosure are used to describe specified embodiments and are not intended to limit the scope of the present disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the present disclosure. In some cases, even if terms are terms which are defined in the present disclosure, they may not be interpreted to exclude embodiments of the present disclosure.

An electronic device according to various embodiments of the present disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit).

According to various embodiments, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be one of the above-described devices or a combination thereof. An electronic device according to an embodiment may be a flexible electronic device. Furthermore, an electronic device according to an embodiment of the present disclosure may not be limited to the above-described electronic devices and may include other electronic devices and new electronic devices according to the development of technologies.

Hereinafter, electronic devices according to various embodiments will be described with reference to the accompanying drawings. In the present disclosure, the term "user" may refer to a person who uses an electronic device or may refer to a device (e.g., an artificial intelligence electronic device) that uses the electronic device.

FIG. 1 illustrates an electronic device 100, according to an embodiment.

Referring to FIG. 1, the electronic device 100 may include an image group creating module 110, a continuous image reproducing module 120, and a content managing hub 130.

The image group creating module 110 may group a plurality of images, which are stored in a memory, into at least one group. For example, the image group creating module 110 may group the images based on similarity, group the image based on the capture time of the images, or group the image based on time that the images are stored in the memory. In addition, the image group creating module 110 may group the images in various schemes, and the grouping schemes are not limited to the above-examples.

According to an embodiment, the image group creating module 110 may include an image feature vector obtaining module 111, a similarity analyzing module 112, and a candidate group determining module 113. The image feature vector obtaining module 111 may obtain feature vectors of the images. The similarity analyzing module 112 may analyze the similarity representing the similar degree between the images, based on the obtained feature vectors. The candidate group determining module 113 may group the images into at least one group based on the similarity.

The continuous image reproducing module 120 may include a sequence determining module 121 and a stabilization module 122. The sequence determining module 121 may determine the sequence of images included in the group. The sequence may be the reproduction sequence of images included in the group. The continuous image reproducing module 120 may create a file reproduced in the sequence. For example, the continuous image reproducing module 120 may create an AGIF (Animated Graphics Interchange Format) file by using the images included in the group.

The stabilization module 122 may insert a new image, which is properly created, between the images such that images are smoothly reproduced. This operation may be referred to as a stabilizing process.

According to an embodiment, the stabilization module 122 may include an image adding module 122a, a group dividing module 122b, an image cropping module 122c, a loop stabilizing module 122d, and a delay adjusting module 122e.

The image adding module 122a may insert a new image between images.

The group dividing module 122b may divide a group created by the image group creating module 110 into at least one subgroup.

The image cropping module 122c may obtain regions including feature points from a plurality of images included in the subgroup. The image cropping module 122c may obtain a commonly overlapping region between regions, when the regions are obtained, and may remove remaining regions other than the commonly overlapping area. The image cropping module 122c may perform image registration for images included in the subgroup. For example, the image cropping module 122c may display images having different coordinate systems in one coordinate system. In addition, the image cropping module 122c may match images included in the subgroup through phase correlation or a sum of squared difference (SSD).

The loop stabilizing module 122d may set the sequence to reproduce an image placed at the beginning of the sequence is played after an image placed at the end of the sequence is reproduced. The loop stabilizing module 122d may add a new image between images and may delete some of the images in the sequence. The loop stabilizing module 122d may divide the image. The delay adjusting module 122e may adjust the time interval at which images are reproduced based on the similarity of the images.

The content managing hub 130 may store metadata of the images. The metadata may include a group including each of the plurality of images, a feature vector, a storage path, a time interval between images, and the like. The content managing hub 130 may store cropped images, a region of interest (ROI), stabilized images obtained from the loop stabilizing module 122d. The content managing hub 130 may store files having forms reproduced in the sequence.

Figure 11:
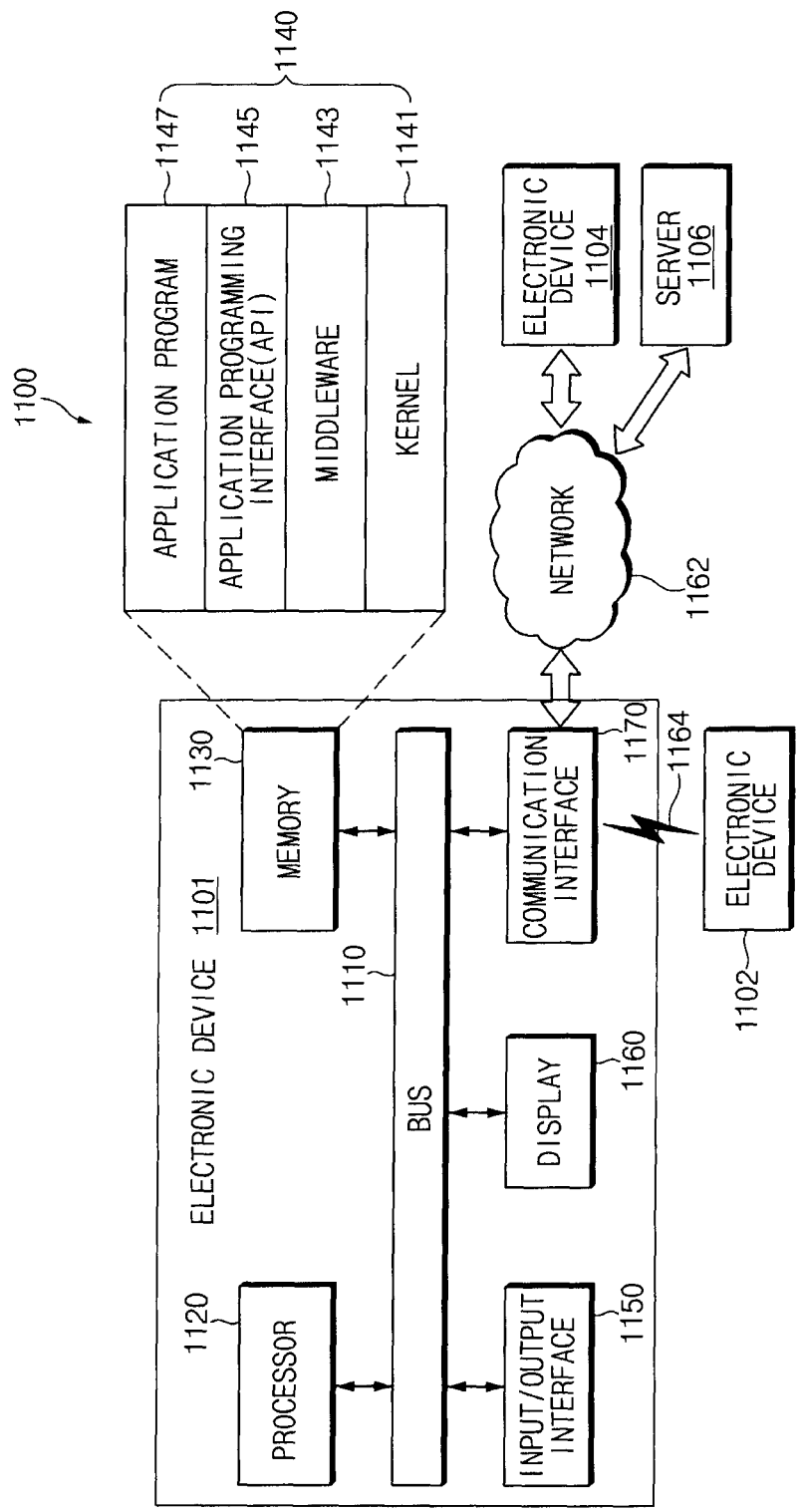
FIG. 11 illustrates an electronic device in a network environment, according to an embodiment.

The software modules 110, 120, and 130 illustrated in FIG. 1 may be realized by the processor 1120 illustrated in FIG. 11.

Figure 2:
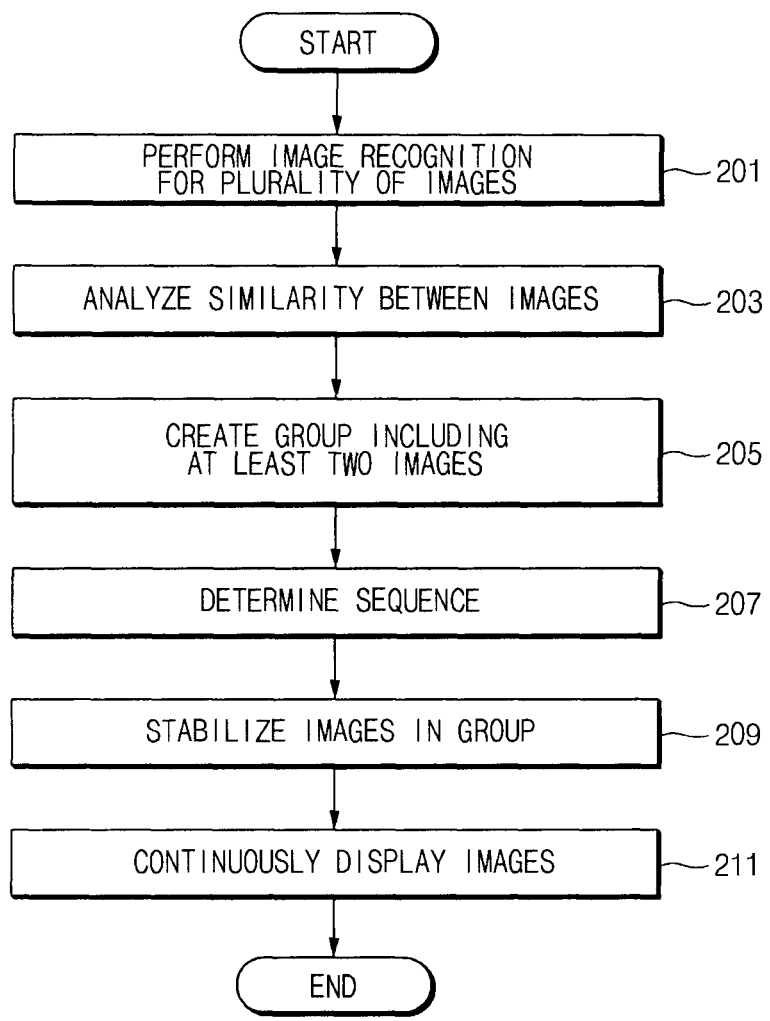
FIG. 2 is a flowchart that an electronic device continuously reproduces images, according to an embodiment.

FIG. 2 is a flowchart that an electronic device continuously reproduces images, according to an embodiment. In the present disclosure, components having the reference numerals the same as the reference numerals in the electronic device 100 described with reference to FIG. 1 may have the same content as that described with reference to FIG. 1.

Referring to FIG. 2, in operation 201, the image feature vector obtaining module 111 may perform image recognition for a plurality of images. According to one embodiment, the image feature vector obtaining module 111 may obtain feature vectors from the images. The feature vector is a vector representing the features of the image, and may include at least one feature value. For example, the image feature vector obtaining module 111 may obtain feature vectors of a plurality of images through algorithms such as Scale Invariant Feature Transform (SIFT), Histogram of Oriented Gradient (HOG), Haar, Object Request Broker (ORB), Features from Accelerated Segment Test (FAST), Adaptive and Generic Corner Detection Based on the Accelerated Segment Test (AGAST). The image feature vector obtaining module 111 may use at least one of the algorithms to obtain a feature vector. The image feature vector obtaining module 111 may obtain a feature vector by additionally using an algorithm other than the above-mentioned algorithm. The scheme in which the image feature vector obtaining module 111 obtains the feature vector is not limited to the above-described embodiment.

When the feature vector is obtained, in operation 203, the similarity analyzing module 112 may analyze the similarity representing the similar degree between images, based on the feature vectors.

In operation 205, the candidate group determining module 113 may create a group including at least two images based on the similarity. At least one group may be provided, and the candidate group determining module 113 may perform grouping similar images in the same group. For example, the images having the backgrounds of a mountain and a sky may be grouped into a first group, and person images may be grouped into a second group.

Although FIG. 2 illustrates that the images are grouped based on the similarity, the candidate group determining module 113 may group images based on the feature vector. The similarity analyzing module 112 may obtain the similarity between images included in the group, when the images are grouped.

Referring to FIG. 2, in operation 207, the sequence determining module 121 may determine the sequence of images included in the group. For example, the sequence determining module 121 may determine the sequence of all images included in the group. According to another embodiment, the sequence determining module 121 may determine the sequence of some images included in the group. In addition, the sequence determining module 121 may determine the sequence for each group based on similarity.

When the sequence is determined, in operation 209, the stabilization module 122 may stabilize the images contained in the group. For example, the images may be stabilized by inserting a new image between the images.

When the images are stabilized, in operation 211, the continuous image reproducing module 120 may display images on the display in sequence. For example, the continuous image reproducing module 120 may reproduce the images in sequence. In the present disclosure, the display and the reproduction may be interpreted as having the same meaning.

According to an embodiment, the continuous image reproducing module 120 may output the images, which are included in the group on the display, in sequence when a reproduction event occurs. The reproduction event may be a touch input by the user, or may be pressure having a specific intensity or more. For example, if a user touches any one of the images in the group, the images in the group may be output on the display in the sequence. If the user presses any one of images in the group with pressure having the specific intensity or more, the images in the group may be output on the display in the sequence.

Figure 3A:
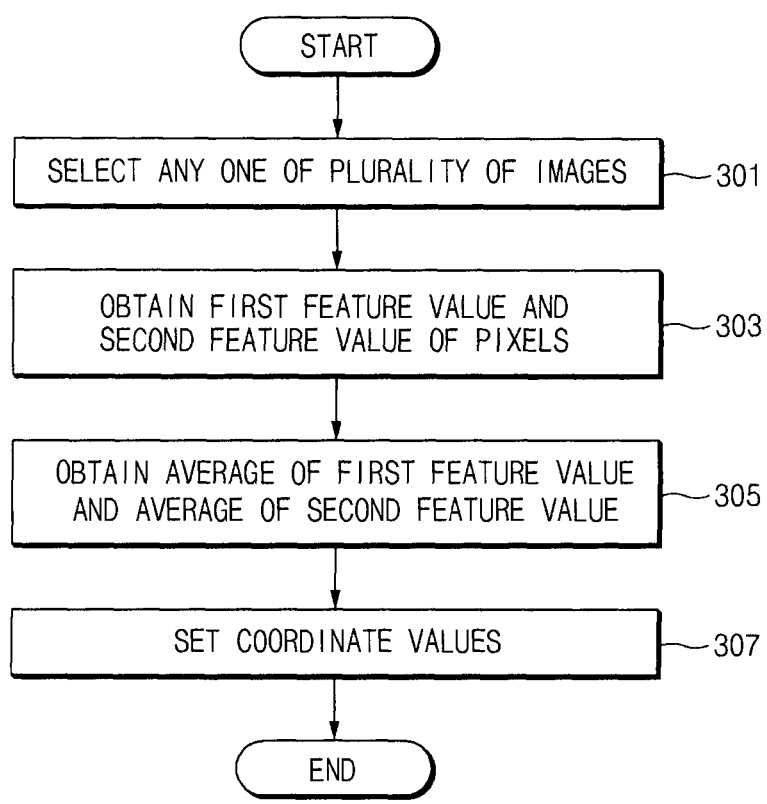
FIG. 3A illustrates a flowchart that the electronic device obtains the feature vector, according to an embodiment.
Figure 3B:
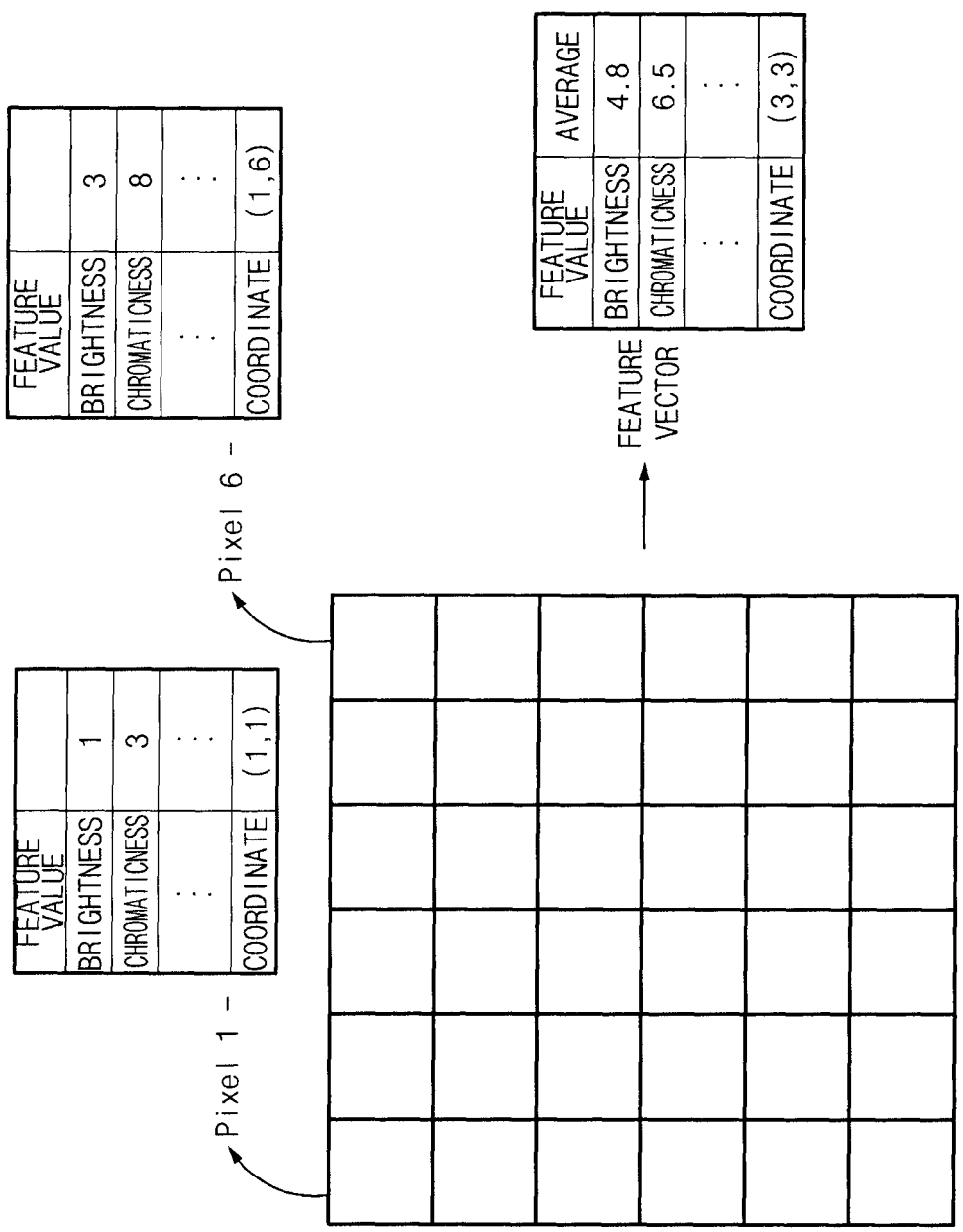
FIG. 3B illustrates that the electronic device obtains a feature vector from a feature value of a pixel, according to an embodiment.

FIG. 3A illustrates a flowchart that the electronic device obtains the feature vector, according to an embodiment. FIG. 3B illustrates that the electronic device obtains the feature vector from the feature value of a pixel, according to an embodiment.

Referring to FIGS. 3A and 3B, in operation 301, the image feature vector obtaining module 111 may select any one of images. The image feature vector obtaining module 111 may obtain a feature vector of the selected image, and then obtain a feature vector of another image. The image feature vector obtaining module 111 may obtain the feature vector by selecting images in arbitrary sequence. According to another embodiment, the image feature vector obtaining module 111 may obtain the feature vector by selecting an image in sequence stored in the memory. The image feature vector obtaining module 111 may simultaneously obtain several feature vectors from the images.

When the image is selected, in operation 303, the image feature vector obtaining module 111 may obtain a first feature value and a second feature value of pixels included in the selected image. The first feature value and the second feature value may be brightness, chromaticness, coordinates, and the like. When the first feature value and the second feature value are obtained, in operation 305, the image feature vector obtaining module 111 may obtain the average of the first feature value and the average of the second feature value. According to an embodiment, the image feature vector obtaining module 111 may obtain the variance of the feature value.

When the average of the first feature value and the average of the second feature value are obtained, the image feature vector obtaining module 111 may obtain the feature vector of the selected image by setting the average of the first feature value and the average of the second feature value as coordinate values. The image feature vector obtaining module 111 may obtain the feature vector of the selected image by setting the variance of the first feature value and the variance of the second feature value as coordinate values.

The method for obtaining the feature vector described with reference to FIGS. 3A and 3B is provided for the illustrative purpose, and the image feature vector obtaining module 111 may obtain a feature vector by using an algorithm such as SIFT, HOG, Haar, ORB, FAST, AGAST described above.

Figure 4A:
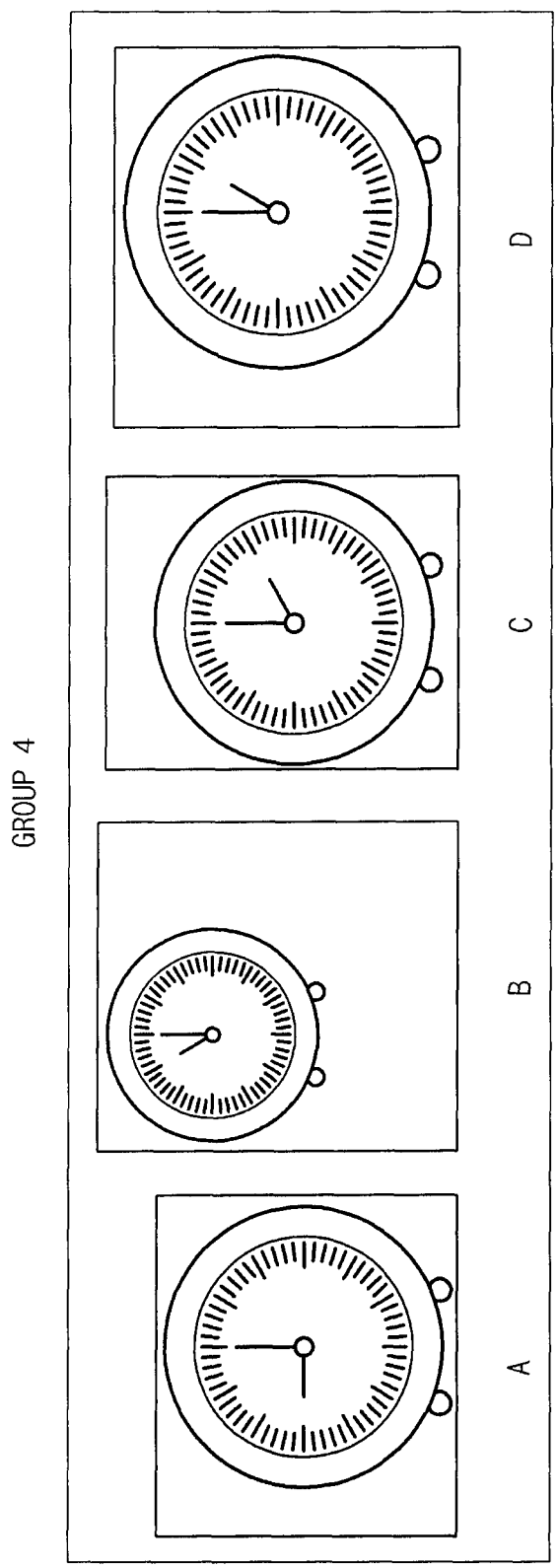
FIG. 4A illustrates images included in a group, according to one embodiment.
Figure 4B:
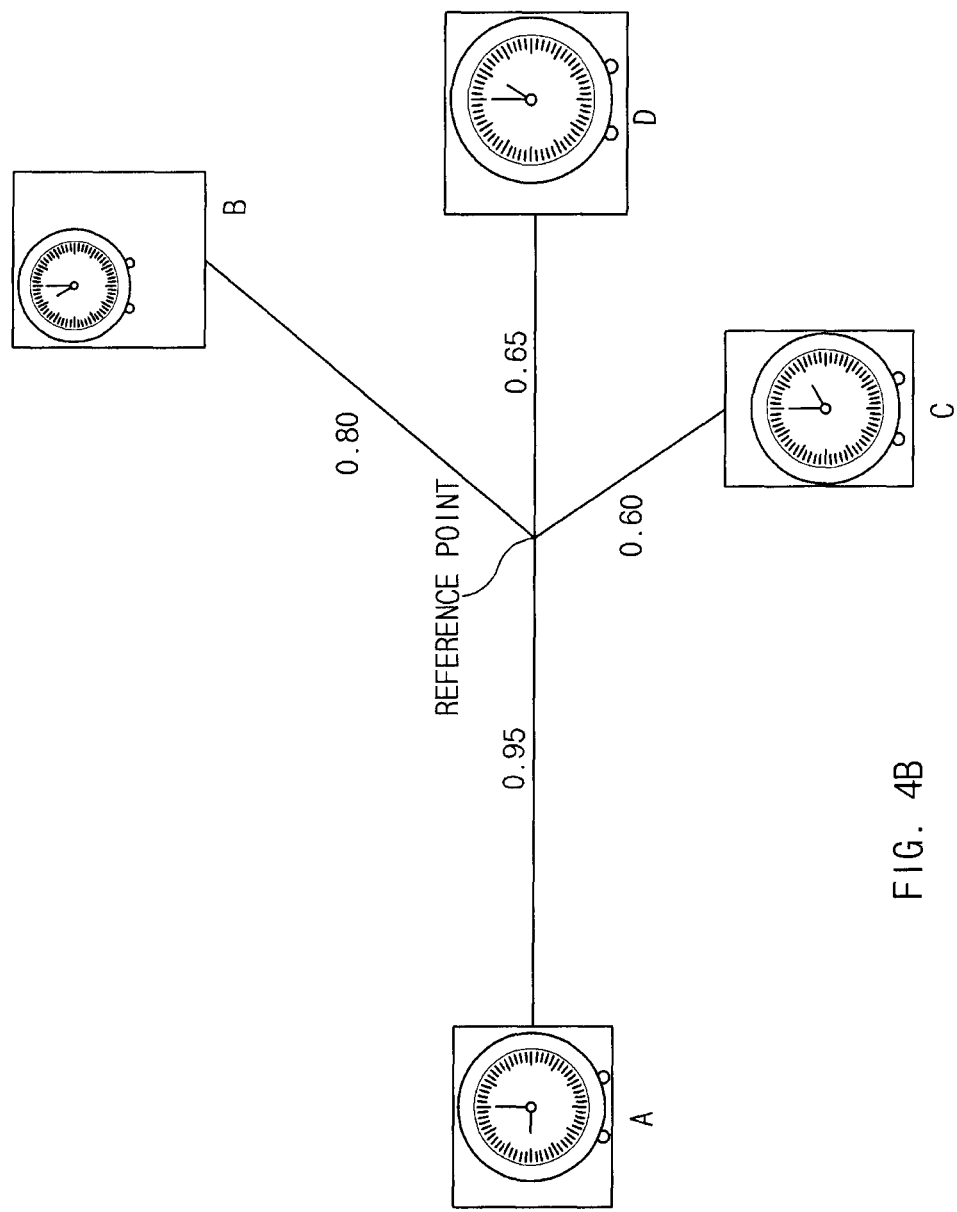
FIG. 4B illustrates that the electronic device obtains the similarity, according to an embodiment.
Figure 4C:
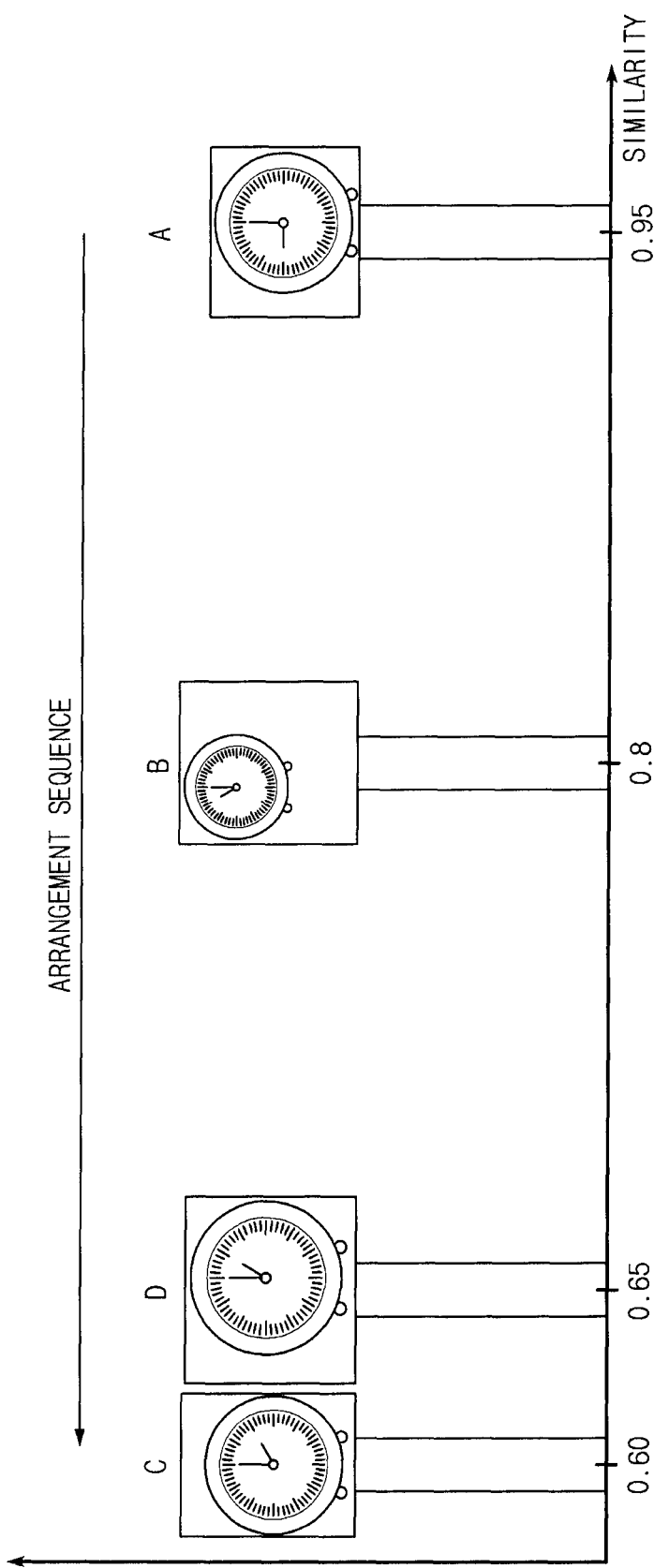
FIG. 4C illustrates that the electronic device arranges the images based on similarity, according to an embodiment.

FIG. 4A illustrates images included in a group according to one embodiment. FIG. 4B illustrates that the electronic device obtains the similarity, according to an embodiment. FIG. 4C illustrates that the electronic device arranges images based on the similarity, according to an embodiment.

Referring to FIG. 4A, in FIG. 4A, a group 4 may include an image A, an image B, an image C, and an image D. The images included in the group 4 are arranged in the sequence of the image A, the image B, and the image C, and the image A and stored. Alternatively, the images included in the group 4 may be randomly arranged and stored.

Referring to FIG. 4B, the similarity analyzing module 112 may obtain similarity indicating the similar degree between images. As the difference between similarities is reduced, images may be more similar to each other. As the difference between similarities is increased, the images may be less similar to each other.

According to an embodiment, the similarity may be the distance between the reference point and each feature vector. The reference point may be a representative value of the feature vectors, and the representative value may be an average value, a variance, or a mode value of the feature vectors. For example, in FIG. 4B, since the distance between the feature vector of the image A and the reference point is 0.95, the similarity may be 0.95. Since the distance between the feature vector of the image B and the reference point is 0.80, the similarity may be 0.80.

According to another embodiment, the similarity may be the distance between the feature vector of the image first selected in the group and the feature vector of another image. For example, if the user first selects the image A in the group 4, the similarity may be the distance between the feature vector of the image A and the feature vector of another image. When the similarity is obtained based on the distance from the feature vector of the image A, as the calculated distance is reduced, the another image may be less similar to the image A.

Referring to FIG. 4C, the sequence determining module 121 may arrange the images in descending order of similarities. When the images are arranged in descending sequence of sizes of similarities, since the images are arranged in sequence of the images more similar to each other, the images may be smoothly reproduced.

Figure 5A:
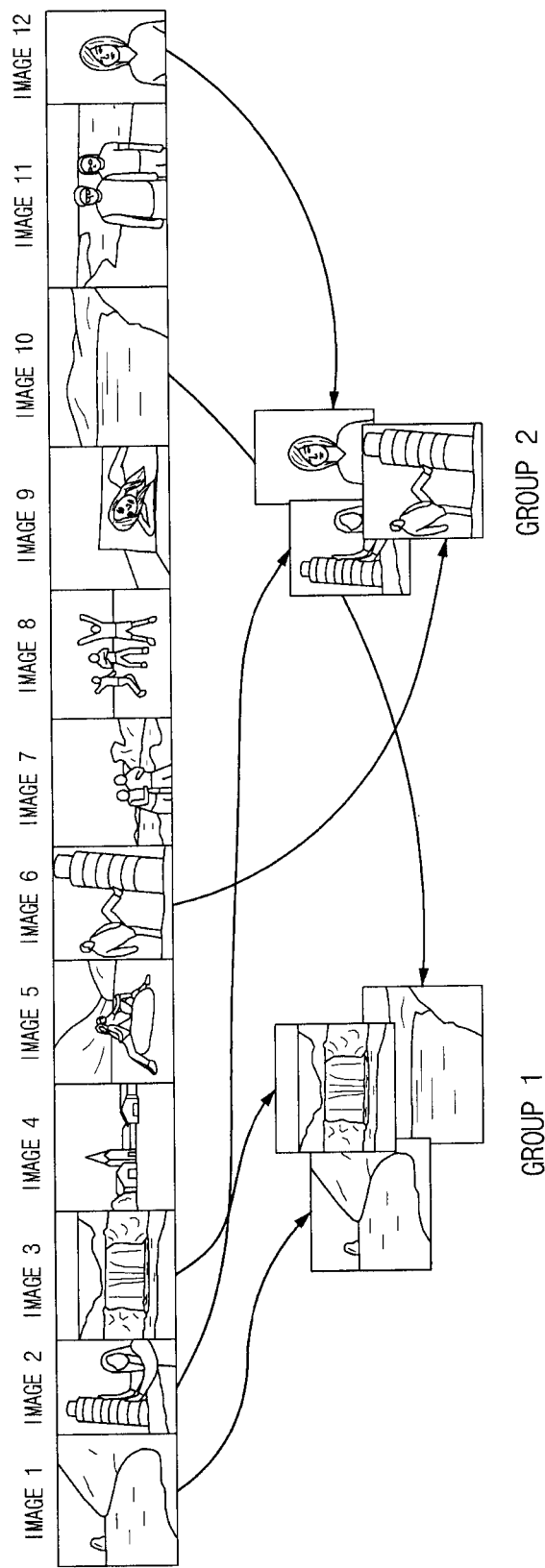
FIG. 5A illustrates that the electronic device groups a plurality of images, according to an embodiment.

FIG. 5A illustrates that the electronic device groups a plurality of images, according to an embodiment.

Referring to FIG. 5A, the candidate group determining module 113 may group a plurality of images based on the obtained similarity. For example, the images 1, 3, and 10 illustrated in FIG. 5A, which are photos having the backgrounds of a mountain and the sky, may be classified as the group 1. The images 2, 6, and 12, which are photos obtained by capturing people and buildings, may be classified as the group 2. The embodiment illustrated in FIG. 5A is only one embodiment, and the candidate group determining module 113 may group images based on the feature vector.

FIG. 5B illustrates that the electronic device groups a plurality of images based on feature vectors.

Referring to FIG. 5B, the candidate group determining module 113 may group the images based on feature vectors. For example, the candidate group determining module 113 may determine images as being similar to each other and may classify the images as a first group, when the coordinate values of the feature vectors are within a predetermined first range. The candidate group determining module 113 may determine images as being similar to each other and may classify the images as a second group, when the coordinate values of the feature vectors are within a predetermined second range. Referring to the image illustrated in FIG. 5A, images 1, 3, and 10 are photos having backgrounds of mountains and sky, and coordinate values of feature vectors may be within a specific range. The candidate group determining module 113 may determine the image 1, the image 3, and the image 10 as being similar to images and may perform grouping as group 1.

Similarly, the images 2, 6, and 12 illustrated in FIG. 5A are photos obtained by capturing people and buildings, and the coordinate values of the feature vectors may be within a specific range. The candidate group determining module 113 may determine the image 2, the image 6, and the image 12 as being similar to images and may perform grouping as the group 2.

Figure 5C:
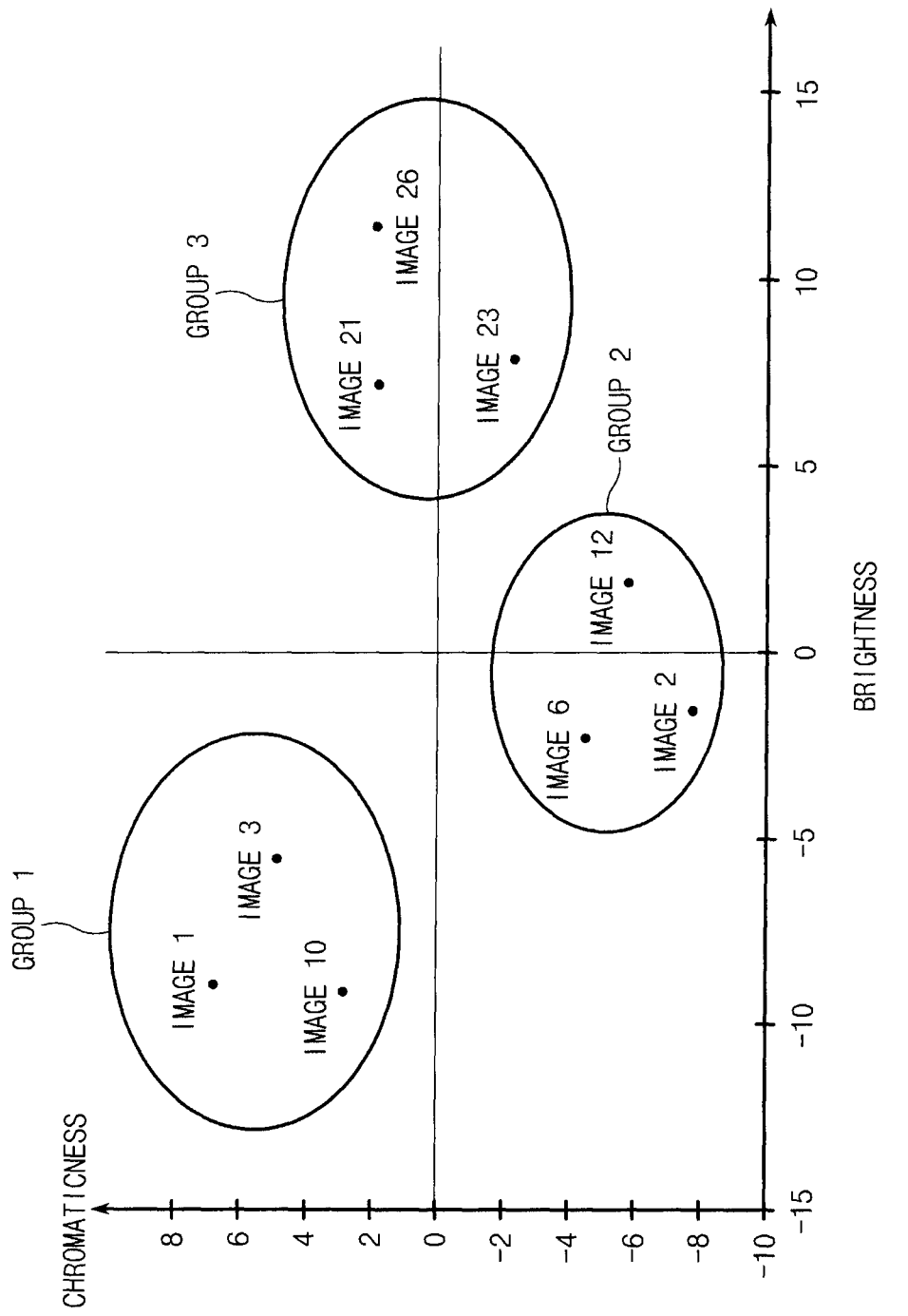
FIG. 5C illustrates that the electronic device groups a plurality of images, according to another embodiment.

FIG. 5C illustrates that the electronic device groups a plurality of images, according to another embodiment.

For example, the candidate group determining module 113 may group a plurality of images through Principal component analysis (PCA) of reducing and showing multi-dimensional data by using one-dimensional component. For example, the candidate group determining module 113 may obtain the variance of feature values of pixels, and then set components based on the obtained variance value. For example, in FIG. 5C, chromaticness and brightness may be components.

When the components are determined, the candidate group determining module 113 may display an image corresponding to each component on a graph. The candidate group determining module 113 may group the images displayed in a specific region on the graph. In FIG. 5C, since the feature values of image 1, image 3, and image 10 have similar distribution, the candidate group determining module 113 may group the image 1, the image 3, and the image 10 into group 1. The candidate group determining module 113 may group image 2, image 6, and image 12 into group 2 because the feature values of the image 2, the image 6, and the image 12 have similar distribution.

Figure 6A:
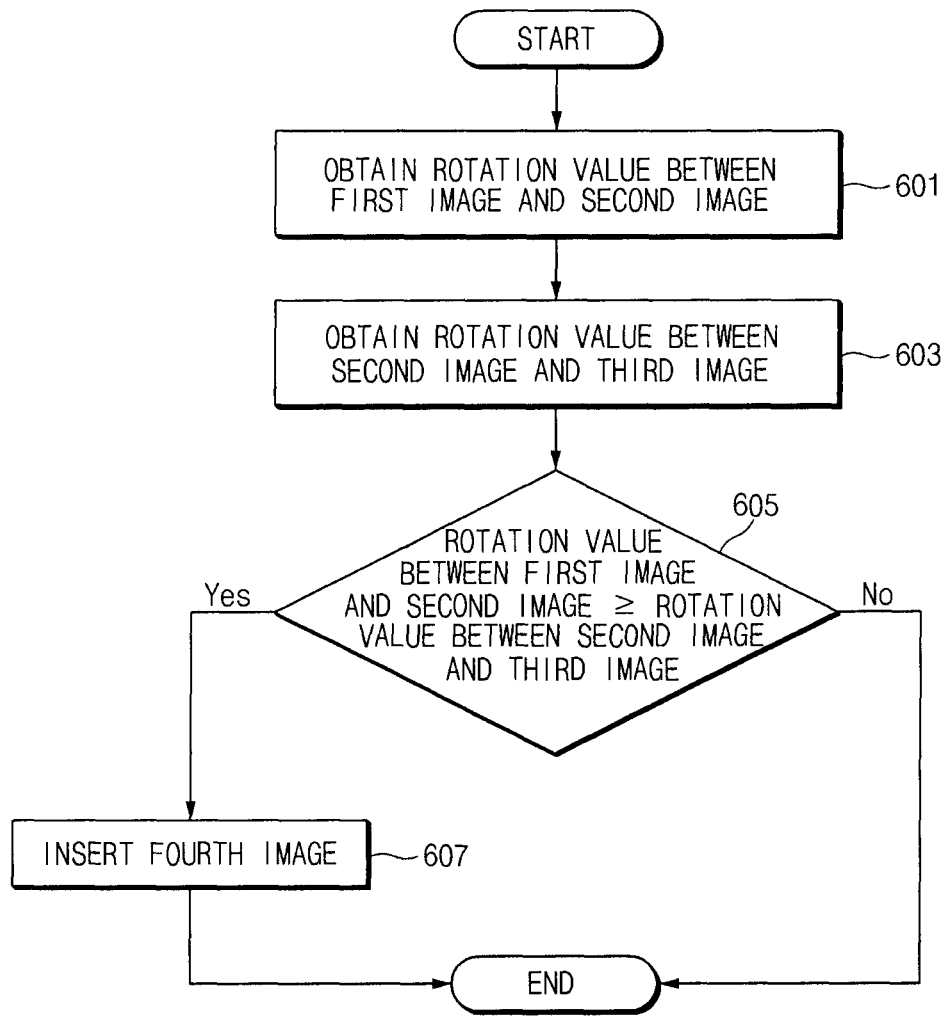
FIG. 6A illustrates a flowchart that the electronic device inserts a similar image based on a rotation value, according to an embodiment.
Figure 6B:
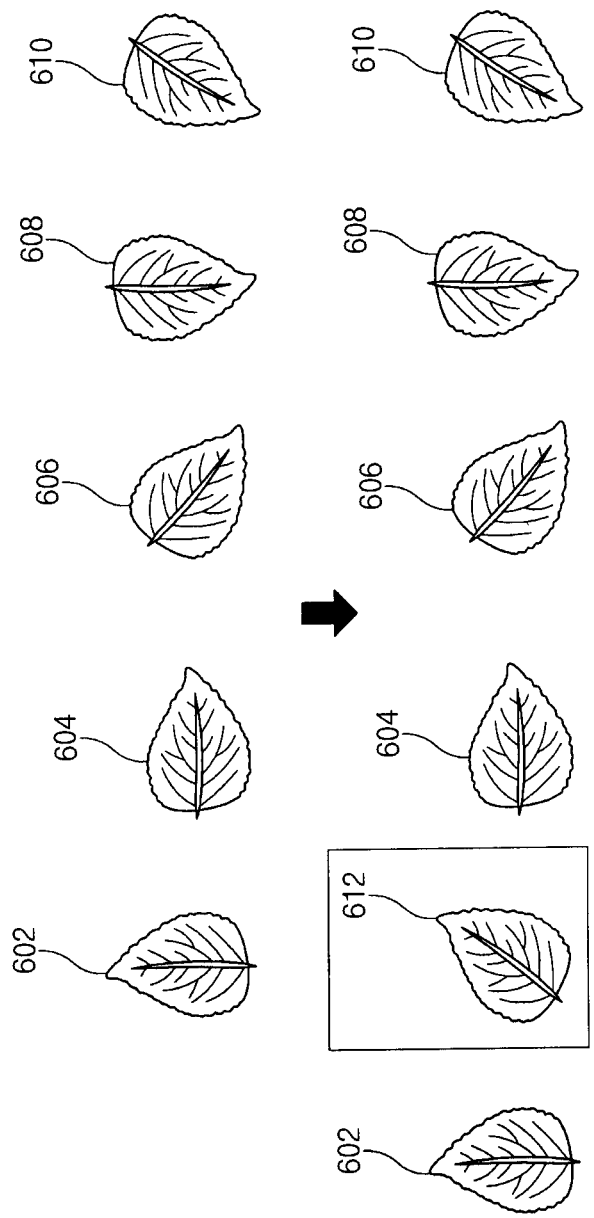
FIG. 6B illustrates that the electronic device rotates an image and inserts the image between different images, according to an embodiment.
Figure 6C:
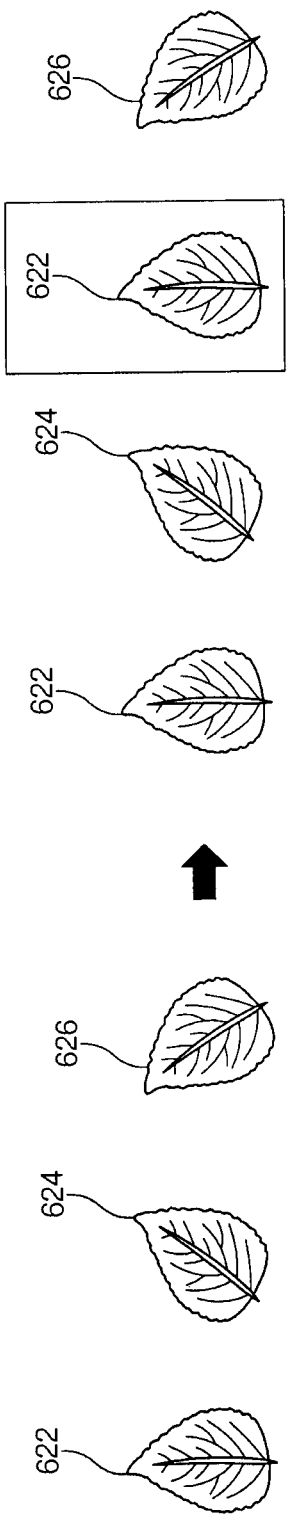
FIG. 6C illustrates that the electronic device inserts an image between different images, according to an embodiment.

FIG. 6A illustrates a flowchart that the electronic device inserts a similar image based on a rotation value, according to an embodiment. FIG. 6B illustrates that the electronic device rotates an image and inserts the image between different images, according to an embodiment. FIG. 6C illustrates that the electronic device inserts an image between different images, according to an embodiment.

Referring to FIG. 6A, in operation 601, the image adding module 122a may obtain a rotation value between the first image and the second image. In operation 603, the image adding module 122a may obtain the rotation value between the second image and the third image. The first image to the third image may be any images included in the group. The rotation value may be a numeric value indicating the degree of rotation between the images. The rotation value may be a matrix that changes the position of pixels included in each image.

When the image adding module 122a determines that the rotation value between the first image and the second image is greater than or equal to the rotation value between the second image and the third image in operation 605, the fourth image may be inserted between the first image and the second image in operation 607. The fourth image, which is an image similar to the first image and the second image, may be any one of the images stored in the memory. The fourth image may be an image obtained by rotating any one of the first image to the third image.

Referring to FIG. 6B, the image adding module 122a may obtain a rotation value between the images. For example, an image 604 may be an image obtained by rotating an image 602 at 90 degrees to the right, and an image 606 may be an image obtained by rotating the image 604 at 45 degrees to the right. Accordingly, the rotation value between the image 604 and the image 602 may be two times greater than the rotation value between the image 606 and the image 604.

When the rotation value is obtained, the image adding module 122a may compare the degree of rotation between the images. The image adding module 122a may insert a fourth image 612, which is described with reference to FIG. 6A, between the images making a greater difference in the rotation value therebetween. For example, in FIG. 6B, the image 604 may be an image obtained by rotating the image 602 at 90 degrees to the right. However, other images 606, 608, and 610 may be images obtained by rotating images 604, 606, and 608 at 45 degrees to the right, respectively. Accordingly, the image adding module 122a may insert the fourth image 612 between the image 602 and the image 604.

Referring to FIG. 6C, the image adding module 122a may compare the degree of rotation among images 622, 624, and 626. As a result of comparing the degree of rotation, when there is an image rotated at a degree of rotation greater than degrees of rotation of the other images, any one of the aligned images may be inserted therebetween. In FIG. 6C, the image 624 is an image obtained by rotating the image 622 at 45 degrees to the right, and the image 626 is an image obtained by rotating the image 622 at 90 degrees to the left. Accordingly, the image adding module 122a may insert the image 622 between the image 624 and the image 626. According to one embodiment of the present disclosure, the images may be smoothly (continuously) reproduced by inserting a similar image between the images.

The image adding module 122a may insert the similar image between images aligned after the sequence determining module 121 determines the sequence. Unlike the above-described embodiment, the image adding module 122a may insert the similar image between the images and then the sequence determining module 121 may determine the sequence. The operation sequence of the image adding module 122a and the sequence determining module 121 is not limited to the above-described embodiment, but may be simultaneously performed.

Figure 7:
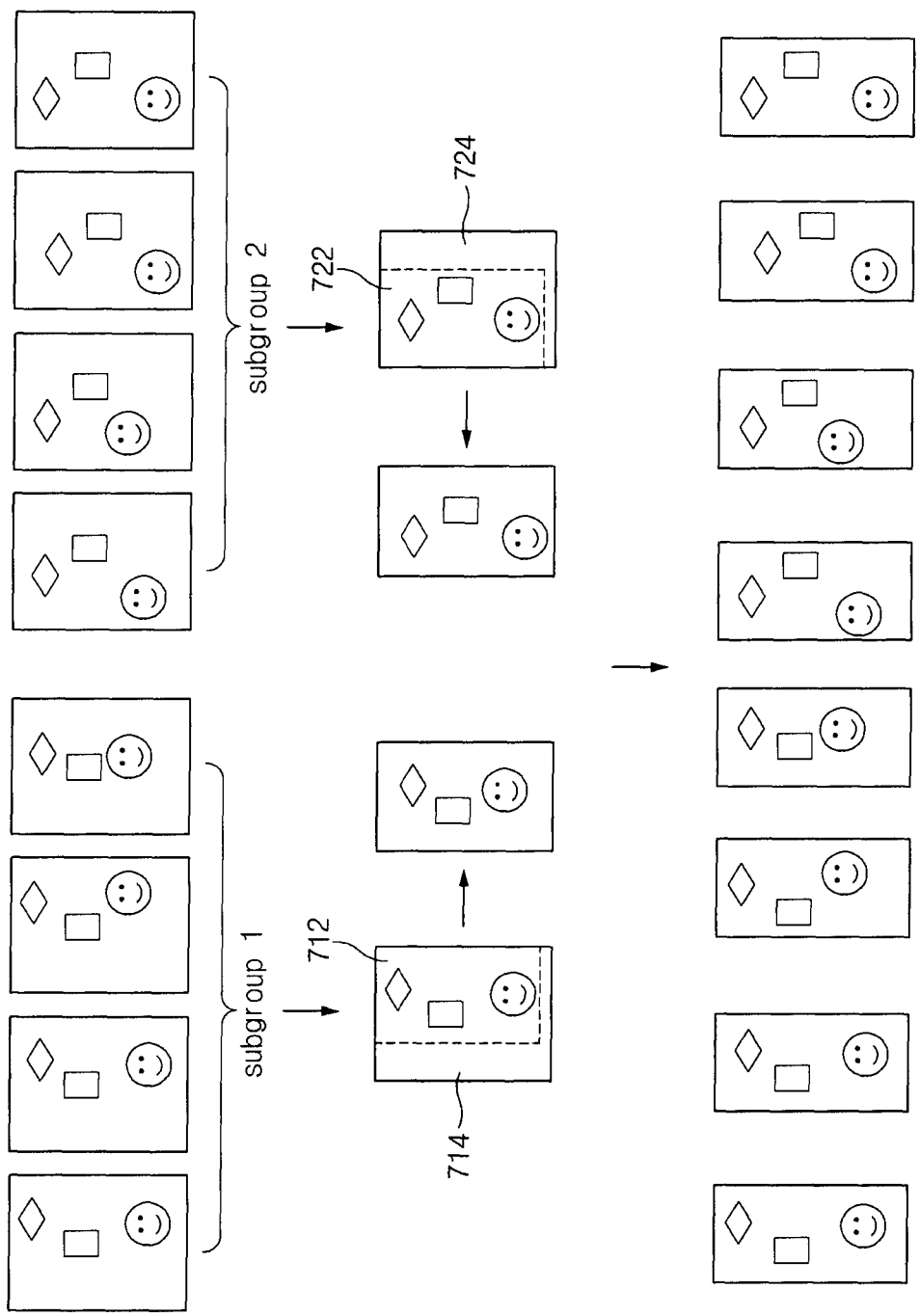
FIG. 7 illustrates that the electronic device extracts a region including a feature point from the image, according to an embodiment.

FIG. 7 illustrates that the electronic device extracts a region including a feature point from the image, according to an embodiment.

Referring to FIG. 7, the group dividing module 122b may divide a group into a first subgroup and a second subgroup based on feature vectors. The group dividing module 122b may divide the group into the first subgroup and the second subgroup based on the degree of similarity. When dividing the group into subgroups, the group dividing module 122b may align images in the unit of a subgroup. When aligning the images, the group dividing module 122b may align images using the similarity as described with reference to FIG. 4, or may use the rotation values as described with reference to FIG. 6.

The image cropping module 122c may obtain a region including feature points from a plurality of images included in the subgroup after the images are aligned. The feature point may be a point having a feature in the image. For example, when the image is a portrait, the feature points may be the beginning and end of an eyebrow, a nose tip, and both ends of mouth. When the regions including the feature points are obtained, the image cropping module 122c may extract regions 712 and 722 where the regions including the feature points are commonly overlapped. When the regions 712 and 722 are extracted, the image cropping module 122c may remove the remaining regions 714 and 724 from the images other than the regions 712 and 722. When the remaining regions 714 and 724 are removed, the continuous image reproducing module 120 may continuously reproduce the regions 712 and 722. According to the embodiment, since the sizes of the images are substantially equal to each other by removing the remaining regions 714 and 724, the images may be smoothly reproduced.

According to another example, the image cropping module 122c may extract a region including an object from the image and may remove a remaining region other than the region including the object. When the remaining region other than the region including the object is removed, the continuous image reproducing module 120 may continuously reproduce the region including the object.

Figure 8:
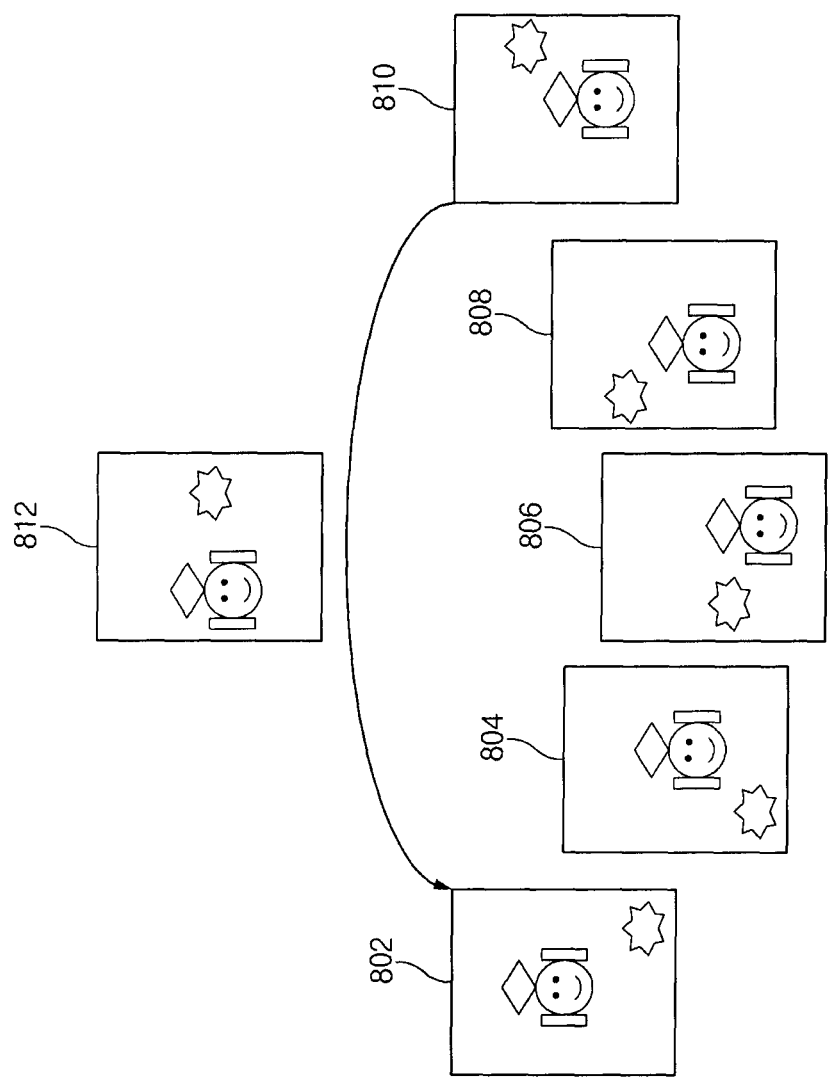
FIG. 8 illustrates that an image disposed at the beginning of the sequence is output after an image disposed at the end of the sequence, according to an embodiment.

FIG. 8 illustrates that an image disposed at the beginning of the sequence is output after an image disposed at the end of the sequence, according to an embodiment.

Referring to FIG. 8, the loop stabilizing module 122d may be configured to output, to the display, a first image 802, which is the first image of the sequence, after a second image 810, which is the last image of the sequence. The first image 802 may be an image disposed at the beginning of the sequence, and the second image 810 may be an image disposed at the end of the sequence. For example, the loop stabilizing module 122d may output the first image 802, an image 804, an image 806, an image 808, and the second image 810, and then may output the first image 802 again, when continuously reproducing the images. According to an embodiment of the present disclosure, the effect of repeated reproduction may be provided by outputting the first image after the second image.

In one embodiment, the loop stabilizing module 122d may insert a third image 812 between the second image 810 and the first image 802 based on the feature vector. The loop stabilizing module 122d may insert the third image 812 between the second image 810 and the first image 802 based on the similarity. The third image 812 may be an image similar to the first image 802 and the second image 810. The third image 812 may be any one of images stored in the memory. The third image 812 may be an image obtained by modifying the first image 802 or the second image 810 by the loop stabilizing module 122d, based on the feature vector or similarity. According to one embodiment of the present disclosure, images may be smoothly reproduced by inserting the third image 812 between the second image 810 and the first image 802.

Figure 9:
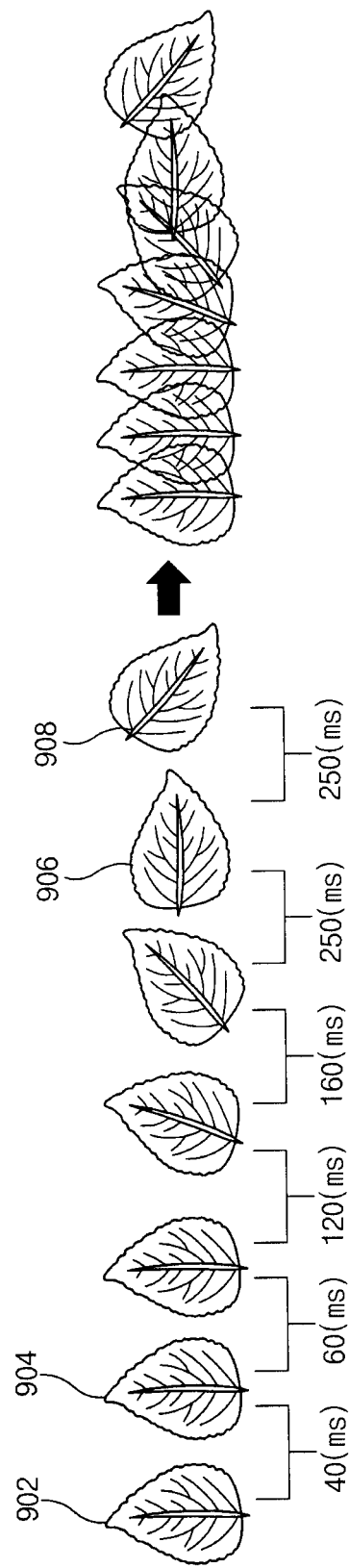
FIG. 9 illustrates that the electronic device arranges the images based on time intervals, according to an embodiment.

FIG. 9 illustrates that the electronic device arranges the images based on time intervals, according to an embodiment.

Referring to FIG. 9, the delay adjusting module 122e may output images with a time interval between the images. The time interval may vary based on similarity. For example, when the similarity is increased, the time interval may be reduced, and when the similarity is decreased, the time interval may be increased.

For example, in FIG. 9, the time interval between an image 902 and an image 904 may be 40 ms when the similarity between the image 902 and the image 904 is great. For example, in FIG. 9, the time interval between an image 906 and an image 908 may be 250 ms when the similarity between the image 906 and the image 908 is less. The continuous image reproducing module 120 may reproduce a plurality of images based on a time interval between relevant images. Thus, according to one embodiment of the present disclosure, the movement of images is shown at a constant speed or a natural speed by adjusting the time interval between images based on the similarity.

Although FIG. 9 illustrates that the sequence is determined and then the time interval is obtained, the delay adjusting module 122e may obtain the time interval and then the sequence determining module 121 may determine the sequence. The operation sequence of the delay adjusting module 122e and the sequence determining module 121 is not limited to the above-described embodiment, but may be simultaneously performed.

Figure 10:
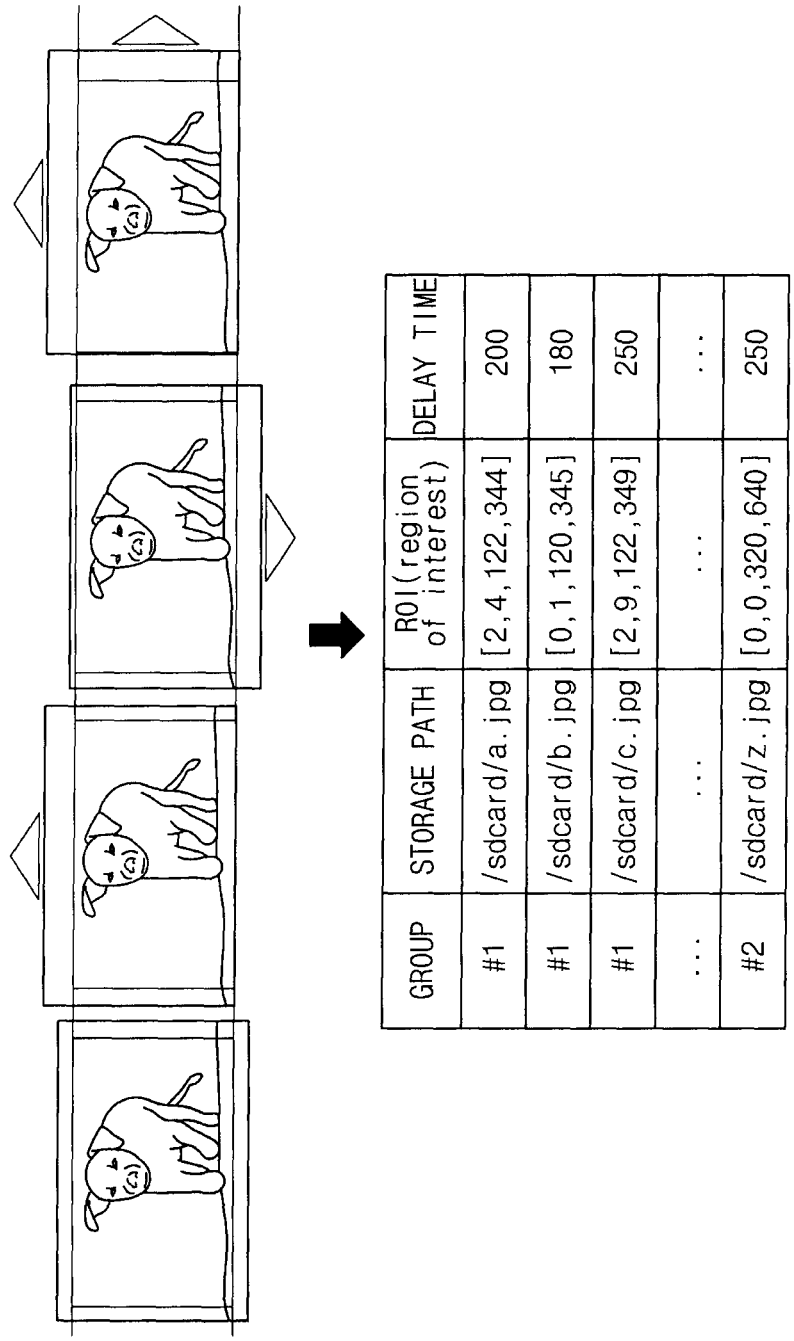
FIG. 10 is a view illustrating that metadata is stored in the content managing hub, according to an embodiment.

FIG. 10 is a view illustrating that metadata is stored in the content managing hub 130, according to an embodiment.

The content managing hub 130 may store metadata of the images. The metadata may be attribute information of a plurality of images, and may include, for example, a date and time when a plurality of images were captured, a date and time of storage, a focal length, and the like. According to one embodiment, the metadata may include a group including each image, a storage path, a feature vector, a region of interest (ROI), and a delay time until an AGIF file is reproduced. When the metadata is stored in the content managing hub 130, the continuous image reproducing module 120 may continuously reproduce images using only metadata.

According to one embodiment, the continuous image reproducing module 120 may create a file that images are reproduced in sequence by using metadata. When the file is created, the content managing hub 130 may store the file. According to an embodiment of the present disclosure, an image is continuously reproduced using the metadata stored in the content managing hub 130, thereby reducing the capacity of the memory.

According to various embodiments of the present disclosure, an electronic device may include a housing, a display exposed through a portion of the housing, a camera device disposed at another portion of the housing, a wireless communication circuit included in the housing, a processor disposed in the housing and electrically connected with the display, the camera device, and the wireless communication circuit, and a memory provided in the housing and electrically connected with the processor. The memory may be configured to store a plurality of images obtained through the camera device and/or the wireless communication circuit. The memory may store instructions that, when executed, cause the processor to perform image recognition for the plurality of images, calculate similarity between the plurality of images, based on a result of the image recognition, create a group including at least two images of the plurality of images, based on the calculated similarity, determine a sequence of outputting, to the display, the at least two images included in the group, based on similarity between the at least two images included in the group, and output the at least two images onto the display in the sequence.

According to various embodiments of the present disclosure, the instructions may cause, when executed, the processor to create a continuous image file including the at least two images, in the sequence, after determining the sequence.

According to various embodiments of the present disclosure, the continuous image file may include an AGIF file format.

According to various embodiments of the present disclosure, the image recognition may include extracting a feature vector from the plurality of images.

According to various embodiments of the present disclosure, the instructions may cause, when executed, the processor to change at least a portion of the at least two images arranged in the sequence after determining the sequence, delete at least a portion of the at least two images arranged in the sequence and/or add a new image created by using at least a portion of the at least two images.

According to various embodiments of the present disclosure, at least a portion of the sequence for the displaying may be different form a sequence of times included in metadata of the images.

According to various embodiments of the present disclosure, the processor may form a portion of a photo application of the instructions.

According to various embodiments of the present disclosure, an electronic device may include a housing, a display exposed through a portion of the housing, a camera device disposed at another portion of the housing, a wireless communication circuit included in the housing, a processor disposed in the housing and electrically connected with the display, the camera device, and the wireless communication circuit, and a memory provided in the housing and electrically connected with the processor. The memory may be configured to store a plurality of images obtained through the camera device and/or the wireless communication circuit. The memory may store instructions that, when executed, cause the processor to perform image recognition for the plurality of images, calculate similarity between the plurality of images, based at least partially on a result of the image recognition, create a group including at least two images of the plurality of images, based at least partially on the calculated similarity, determine the sequence for the displaying, which is at least partially different form a sequence of times included in metadata of the images, and display the at least two images onto the display in the sequence.

According to various embodiments of the present disclosure, the instructions may cause, when executed, the processor to create a continuous image file including the at least two images, in the sequence, after determining the sequence.

According to various embodiments of the present disclosure, the continuous image file may include an AGIF file format.

According to various embodiments of the present disclosure, the image recognition may include extracting a feature vector from the plurality of images.

According to various embodiments of the present disclosure, the instructions may cause, when executed, the processor to change at least a portion of the at least two images arranged in the sequence after determining the sequence, delete at least a portion of the at least two images arranged in the sequence and/or add a new image created by using at least a portion of the at least two images.

According to various embodiments of the present disclosure, the processor may form a portion of a photo application of the instructions.

According to various embodiments of the present disclosure, a method may include performing image recognition for a plurality of images, calculating similarity between the plurality of images, based on a result of the image recognition, creating a group including at least two images of the plurality of images, based on the calculated similarity, determining a sequence for displaying based at least partially on the similarity between the at least two images included in the group, and displaying the at least two images onto the display, in the sequence.

According to various embodiments of the present disclosure, the method may further include creating a continuous image file including the at least two images, in the sequence, after determining the sequence.

According to various embodiments of the present disclosure, the continuous image file may include an AGIF file format.

According to various embodiments of the present disclosure, the performing of the image recognition for the plurality of images may include extracting a feature vector from the plurality of images.

According to various embodiments of the present disclosure, the method may further include changing at least a portion of the at least two images arranged in the sequence after determining the sequence, deleting at least a portion of the at least two images arranged in the sequence and/or adding a new image created by using at least a portion of the at least two images.

According to various embodiments of the present disclosure, the determining of the sequence for displaying may include determining the sequence for the displaying, which is at least partially different form a sequence of times included in metadata of the images.

According to various embodiments of the present disclosure, the method may further include forming a portion of a photo application.

FIG. 11 illustrates an electronic device in a network environment system, according to an embodiment.

Referring to FIG. 11, according to various embodiments, an electronic device 1101, a first electronic device 1102, a second electronic device 1104, or a server 1106 may be connected each other over a network 1162 or a short range communication 1164. The electronic device 1101 may include a bus 1110, a processor 1120, a memory 1130, an input/output interface 1150, a display 1160, and a communication interface 1170. According to an embodiment, the electronic device 1101 may not include at least one of the above-described components or may further include other component(s).

For example, the bus 1110 may interconnect the above-described components 1110 to 1170 and may include a circuit for conveying communications (e.g., a control message and/or data) among the above-described components.

The processor 1120 may include one or more of a central processing unit (CPU), an application processor (AP), or a communication processor (CP). For example, the processor 1120 may perform an arithmetic operation or data processing associated with control and/or communication of at least other components of the electronic device 1101. In an embodiment, the instruction capable of programming the software modules illustrated in FIG. 1 may be stored in the memory 1130. The processor 1120 may call the instruction to implement the software modules illustrated in FIG. 1. In an embodiment, the software modules illustrated in FIG. 1 may include at least one instruction set and the memory set may be stored in the memory 1130. The processor 1120 may call the instruction set to implement the software modules.

The memory 1130 may include a volatile and/or nonvolatile memory. For example, the memory 1130 may store commands or data associated with at least one other component(s) of the electronic device 1101. According to an embodiment, the memory 1130 may store software and/or a program 1140. The program 1140 may include, for example, a kernel 1141, a middleware 1143, an application programming interface (API) 1145, and/or an application program (or "an application") 1147. At least a part of the kernel 1141, the middleware 1143, or the API 1145 may be referred to as an "operating system (OS)".

For example, the kernel 1141 may control or manage system resources (e.g., the bus 1110, the processor 1120, the memory 1130, and the like) that are used to execute operations or functions of other programs (e.g., the middleware 1143, the API 1145, and the application program 1147). Furthermore, the kernel 1141 may provide an interface that allows the middleware 1143, the API 1145, or the application program 1147 to access discrete components of the electronic device 1101 so as to control or manage system resources.

The middleware 1143 may perform, for example, a mediation role such that the API 1145 or the application program 1147 communicates with the kernel 1141 to exchange data.

Furthermore, the middleware 1143 may process task requests received from the application program 1147 according to a priority. For example, the middleware 1143 may assign the priority, which makes it possible to use a system resource (e.g., the bus 1110, the processor 1120, the memory 1130, or the like) of the electronic device 1101, to at least one of the application program 1147. For example, the middleware 1143 may process the one or more task requests according to the priority assigned to the at least one, which makes it possible to perform scheduling or load balancing on the one or more task requests.

The API 1145 may be, for example, an interface through which the application program 1147 controls a function provided by the kernel 1141 or the middleware 1143, and may include, for example, at least one interface or function (e.g., an instruction) for a file control, a window control, image processing, a character control, or the like.

The input/output interface 1150 may play a role, for example, of an interface which transmits a command or data input from a user or another external device, to other component(s) of the electronic device 1101. Furthermore, the input/output interface 1150 may output a command or data, received from other component(s) of the electronic device 1101, to a user or another external device.

The display 1160 may include, for example, a liquid crystal display (LCD), a light-emitting diode (LED) display, an organic LED (OLED) display, a microelectromechanical systems (MEMS) display, or an electronic paper display. The display 1160 may display, for example, various contents (e.g., a text, an image, a video, an icon, a symbol, and the like) to a user. The display 1160 may include a touch screen and may receive, for example, a touch, gesture, proximity, or hovering input using an electronic pen or a part of a user's body.

For example, the communication interface 1170 may establish communication between the electronic device 1101 and an external device (e.g., the first electronic device 1102, the second electronic device 1104, or the server 1106). For example, the communication interface 1170 may be connected to the network 1162 over wireless communication or wired communication to communicate with the external device (e.g., the second electronic device 1104 or the server 1106).

The wireless communication may use at least one of, for example, long-term evolution (LTE), LTE Advanced (LTE-A), Code Division Multiple Access (CDMA), Wideband CDMA (WCDMA), Universal Mobile Telecommunications System (UNITS), Wireless Broadband (WiBro), Global System for Mobile Communications (GSM), or the like, as cellular communication protocol. Furthermore, the wireless communication may include, for example, the short range communication 1164. The short range communication 1164 may include at least one of wireless fidelity (Wi-Fi), Bluetooth, near field communication (NFC), magnetic stripe transmission (MST), a global navigation satellite system (GNSS), or the like.

The MST may generate a pulse in response to transmission data using an electromagnetic signal, and the pulse may generate a magnetic field signal. The electronic device 1101 may transfer the magnetic field signal to point of sale (POS), and the POS may detect the magnetic field signal using a MST reader. The POS may recover the data by converting the detected magnetic field signal to an electrical signal.

The GNSS may include at least one of, for example, a global positioning system (GPS), a global navigation satellite system (Glonass), a Beidou navigation satellite system (hereinafter referred to as "Beidou"), or an European global satellite-based navigation system (hereinafter referred to as "Galileo") based on an available region, a bandwidth, or the like. Hereinafter, in the present disclosure, "GPS" and "GNSS" may be interchangeably used. The wired communication may include at least one of, for example, a universal serial bus (USB), a high definition multimedia interface (HDMI), a recommended standard-232 (RS-232), a plain old telephone service (POTS), or the like. The network 1162 may include at least one of telecommunications networks, for example, a computer network (e.g., LAN or WAN), an Internet, or a telephone network.

Each of the first and second electronic devices 1102 and 1104 may be a device of which the type is different from or the same as that of the electronic device 1101. According to an embodiment, the server 1106 may include a group of one or more servers. According to various embodiments, all or a portion of operations that the electronic device 1101 will perform may be executed by another or plural electronic devices (e.g., the first electronic device 1102, the second electronic device 1104 or the server 1106). According to an embodiment, in the case where the electronic device 1101 executes any function or service automatically or in response to a request, the electronic device 1101 may not perform the function or the service internally, but, alternatively additionally, it may request at least a portion of a function associated with the electronic device 1101 from another device (e.g., the electronic device 1102 or 1104 or the server 1106). The other electronic device may execute the requested function or additional function and may transmit the execution result to the electronic device 1101. The electronic device 1101 may provide the requested function or service using the received result or may additionally process the received result to provide the requested function or service. To this end, for example, cloud computing, distributed computing, or client-server computing may be used.

Figure 12:
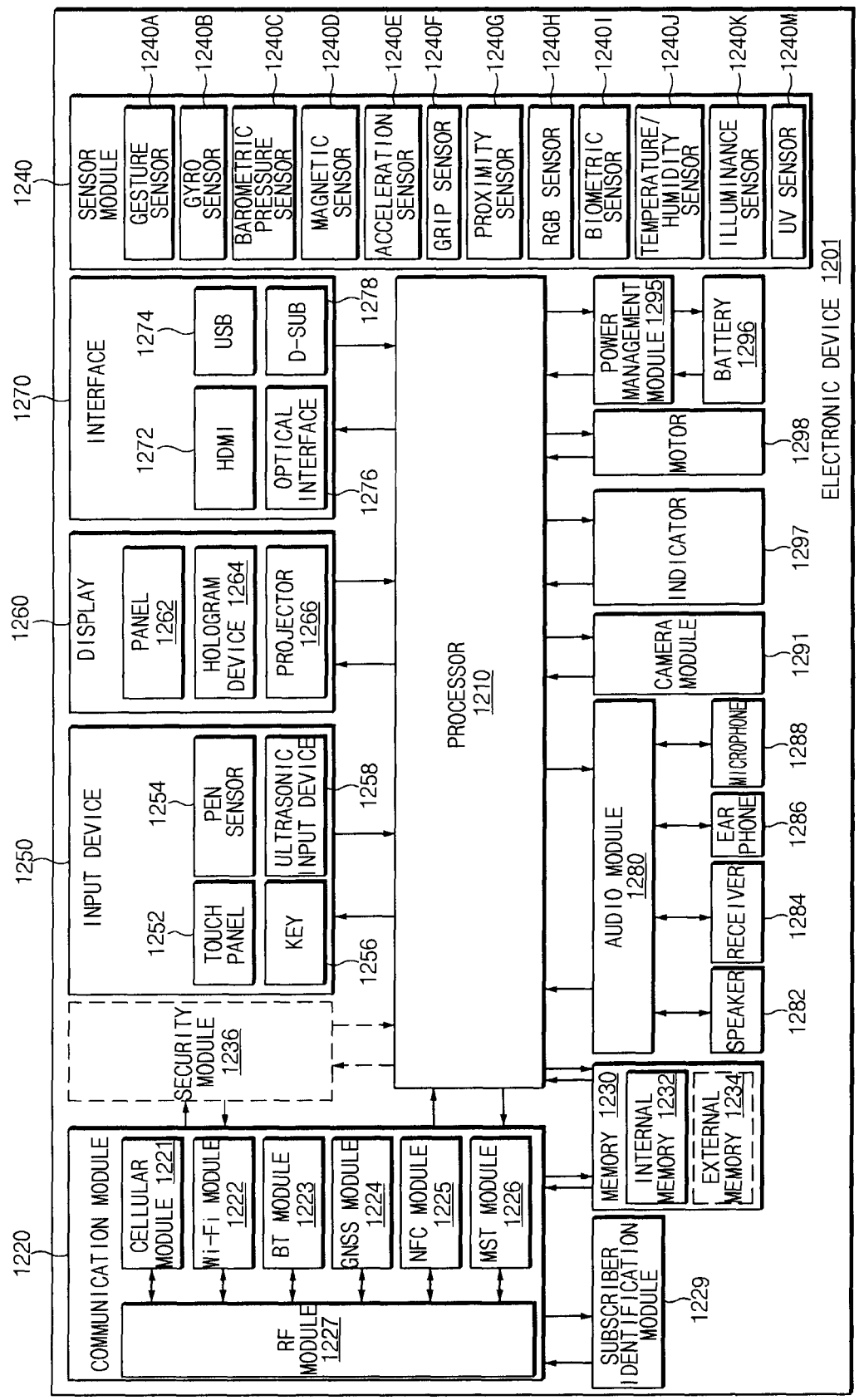
FIG. 12 illustrates a block diagram illustrating the electronic device, according to an embodiment.

FIG. 12 illustrates a block diagram of an electronic device, according to an embodiment.

Referring to FIG. 12, an electronic device 1201 may include, for example, all or a part of the electronic device 1101 illustrated in FIG. 11. The electronic device 1201 may include one or more processors (e.g., an application processor (AP)) 1210, a communication module 1220, a subscriber identification module 1229, a memory 1230, a sensor module 1240, an input device 1250, a display 1260, an interface 1270, an audio module 1280, a camera module 1291, a power management module 1295, a battery 1296, an indicator 1297, and a motor 1298.

The processor 1210 may drive, for example, an operating system (OS) or an application to control a plurality of hardware or software components connected to the processor 1210 and may process and compute a variety of data. For example, the processor 1210 may be implemented with a System on Chip (SoC). According to an embodiment, the processor 1210 may further include a graphic processing unit (GPU) and/or an image signal processor. The processor 1210 may include at least a part (e.g., a cellular module 1221) of components illustrated in FIG. 12. The processor 1210 may load a command or data, which is received from at least one of other components (e.g., a nonvolatile memory), into a volatile memory and process the loaded command or data. The processor 1210 may store a variety of data in the nonvolatile memory.

The communication module 1220 may be configured the same as or similar to the communication interface 1170 of FIG. 11. The communication module 1220 may include the cellular module 1221, a Wi-Fi module 1222, a Bluetooth (BT) module 1223, a GNSS module 1224 (e.g., a GPS module, a Glonass module, a Beidou module, or a Galileo module), a near field communication (NFC) module 1225, a MST module 1226 and a radio frequency (RF) module 1227.

The cellular module 1221 may provide, for example, voice communication, video communication, a character service, an Internet service, or the like over a communication network. According to an embodiment, the cellular module 1221 may perform discrimination and authentication of the electronic device 1201 within a communication network by using the subscriber identification module (e.g., a SIM card) 1229. According to an embodiment, the cellular module 1221 may perform at least a portion of functions that the processor 1210 provides. According to an embodiment, the cellular module 1221 may include a communication processor (CP).

Each of the Wi-Fi module 1222, the BT module 1223, the GNSS module 1224, the NFC module 1225, or the MST module 1226 may include a processor for processing data exchanged through a corresponding module, for example. According to an embodiment, at least a part (e.g., two or more) of the cellular module 1221, the Wi-Fi module 1222, the BT module 1223, the GNSS module 1224, the NFC module 1225, or the MST module 1226 may be included within one Integrated Circuit (IC) or an IC package.

For example, the RF module 1227 may transmit and receive a communication signal (e.g., an RF signal). For example, the RF module 1227 may include a transceiver, a power amplifier module (PAM), a frequency filter, a low noise amplifier (LNA), an antenna, or the like. According to another embodiment, at least one of the cellular module 1221, the Wi-Fi module 1222, the BT module 1223, the GNSS module 1224, the NFC module 1225, or the MST module 1226 may transmit and receive an RF signal through a separate RF module.

The subscriber identification module 1229 may include, for example, a card and/or embedded SIM that includes a subscriber identification module and may include unique identify information (e.g., integrated circuit card identifier (ICCID)) or subscriber information (e.g., integrated mobile subscriber identity (IMSI)).

The memory 1230 (e.g., the memory 1130) may include an internal memory 1232 or an external memory 1234. For example, the internal memory 1232 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), or the like), a hard drive, or a solid state drive (SSD).

The external memory 1234 may further include a flash drive such as compact flash (CF), secure digital (SD), micro secure digital (Micro-SD), mini secure digital (Mini-SD), extreme digital (xD), a multimedia card (MMC), a memory stick, or the like. The external memory 1234 may be operatively and/or physically connected to the electronic device 1201 through various interfaces.

A security module 1236 may be a module that includes a storage space of which a security level is higher than that of the memory 1230 and may be a circuit that guarantees safe data storage and a protected execution environment. The security module 1236 may be implemented with a separate circuit and may include a separate processor. For example, the security module 1236 may be in a smart chip or a secure digital (SD) card, which is removable, or may include an embedded secure element (eSE) embedded in a fixed chip of the electronic device 1201. Furthermore, the security module 1236 may operate based on an operating system (OS) that is different from the OS of the electronic device 1201. For example, the security module 1236 may operate based on java card open platform (JCOP) OS.

The sensor module 1240 may measure, for example, a physical quantity or may detect an operation state of the electronic device 1201. The sensor module 1240 may convert the measured or detected information to an electric signal. For example, the sensor module 1240 may include at least one of a gesture sensor 1240A, a gyro sensor 1240B, a barometric pressure sensor 1240C, a magnetic sensor 1240D, an acceleration sensor 1240E, a grip sensor 1240F, the proximity sensor 1240G, a color sensor 1240H (e.g., red, green, blue (RGB) sensor), a biometric sensor 1240I, a temperature/humidity sensor 1240J, an illuminance sensor 1240K, or an UV sensor 1240M. Although not illustrated, additionally or alternatively, the sensor module 1240 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 1240 may further include a control circuit for controlling at least one or more sensors included therein. According to an embodiment, the electronic device 1201 may further include a processor that is a part of the processor 1210 or independent of the processor 1210 and is configured to control the sensor module 1240. The processor may control the sensor module 1240 while the processor 1210 remains at a sleep state.

The input device 1250 may include, for example, a touch panel 1252, a (digital) pen sensor 1254, a key 1256, or an ultrasonic input unit 1258. For example, the touch panel 1252 may use at least one of capacitive, resistive, infrared and ultrasonic detecting methods. Also, the touch panel 1252 may further include a control circuit. The touch panel 1252 may further include a tactile layer to provide a tactile reaction to a user.

The (digital) pen sensor 1254 may be, for example, a part of a touch panel or may include an additional sheet for recognition. The key 1256 may include, for example, a physical button, an optical key, a keypad, or the like. The ultrasonic input device 1258 may detect (or sense) an ultrasonic signal, which is generated from an input device, through a microphone (e.g., a microphone 1288) and may check data corresponding to the detected ultrasonic signal.

The display 1260 (e.g., the display 1160) may include a panel 1262, a hologram device 1264, or a projector 1266. The panel 1262 may be the same as or similar to the display 1160 illustrated in FIG. 11. The panel 1262 may be implemented, for example, to be flexible, transparent or wearable. The panel 1262 and the touch panel 1252 may be integrated into a single module. The hologram device 1264 may display a stereoscopic image in a space using a light interference phenomenon. The projector 1266 may project light onto a screen so as to display an image. For example, the screen may be arranged in the inside or the outside of the electronic device 1201. According to an embodiment, the display 1260 may further include a control circuit for controlling the panel 1262, the hologram device 1264, or the projector 1266.

The interface 1270 may include, for example, a high-definition multimedia interface (HDMI) 1272, a universal serial bus (USB) 1274, an optical interface 1276, or a D-subminiature (D-sub) 1278. The interface 1270 may be included, for example, in the communication interface 1170 illustrated in FIG. 11. Additionally or alternatively, the interface 1270 may include, for example, a mobile high definition link (MHL) interface, a SD card/multimedia card (MMC) interface, or an infrared data association (IrDA) standard interface.

The audio module 1280 may convert a sound and an electric signal in dual directions. At least a component of the audio module 1280 may be included, for example, in the input/output interface 1150 illustrated in FIG. 11. The audio module 1280 may process, for example, sound information that is input or output through a speaker 1282, a receiver 1284, an earphone 1286, or the microphone 1288.

For example, the camera module 1291 may shoot a still image or a video. According to an embodiment, the camera module 1291 may include at least one or more image sensors (e.g., a front sensor or a rear sensor), a lens, an image signal processor (ISP), or a flash (e.g., an LED or a xenon lamp).

The power management module 1295 may manage, for example, power of the electronic device 1201. According to an embodiment, a power management integrated circuit (PMIC), a charger IC, or a battery or fuel gauge may be included in the power management module 1295. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, or a rectifier, and the like. The battery gauge may measure, for example, a remaining capacity of the battery 1296 and a voltage, current or temperature thereof while the battery is charged. The battery 1296 may include, for example, a rechargeable battery and/or a solar battery.

The indicator 1297 may display a specific state of the electronic device 1201 or a part thereof (e.g., the processor 1210), such as a booting state, a message state, a charging state, and the like. The motor 1298 may convert an electrical signal into a mechanical vibration and may generate the following effects: vibration, haptic, and the like. Although not illustrated, a processing device (e.g., a GPU) for supporting a mobile TV may be included in the electronic device 1201. The processing device for supporting the mobile TV may process media data according to the standards of digital multimedia broadcasting (DMB), digital video broadcasting (DVB), MediaFlo™, or the like.

Each of the above-mentioned components of the electronic device according to various embodiments of the present disclosure may be configured with one or more parts, and the names of the components may be changed according to the type of the electronic device. In various embodiments, the electronic device may include at least one of the above-mentioned components, and some components may be omitted or other additional components may be added. Furthermore, some of the components of the electronic device according to various embodiments may be combined with each other so as to form one entity, so that the functions of the components may be performed in the same manner as before the combination.

Figure 13:
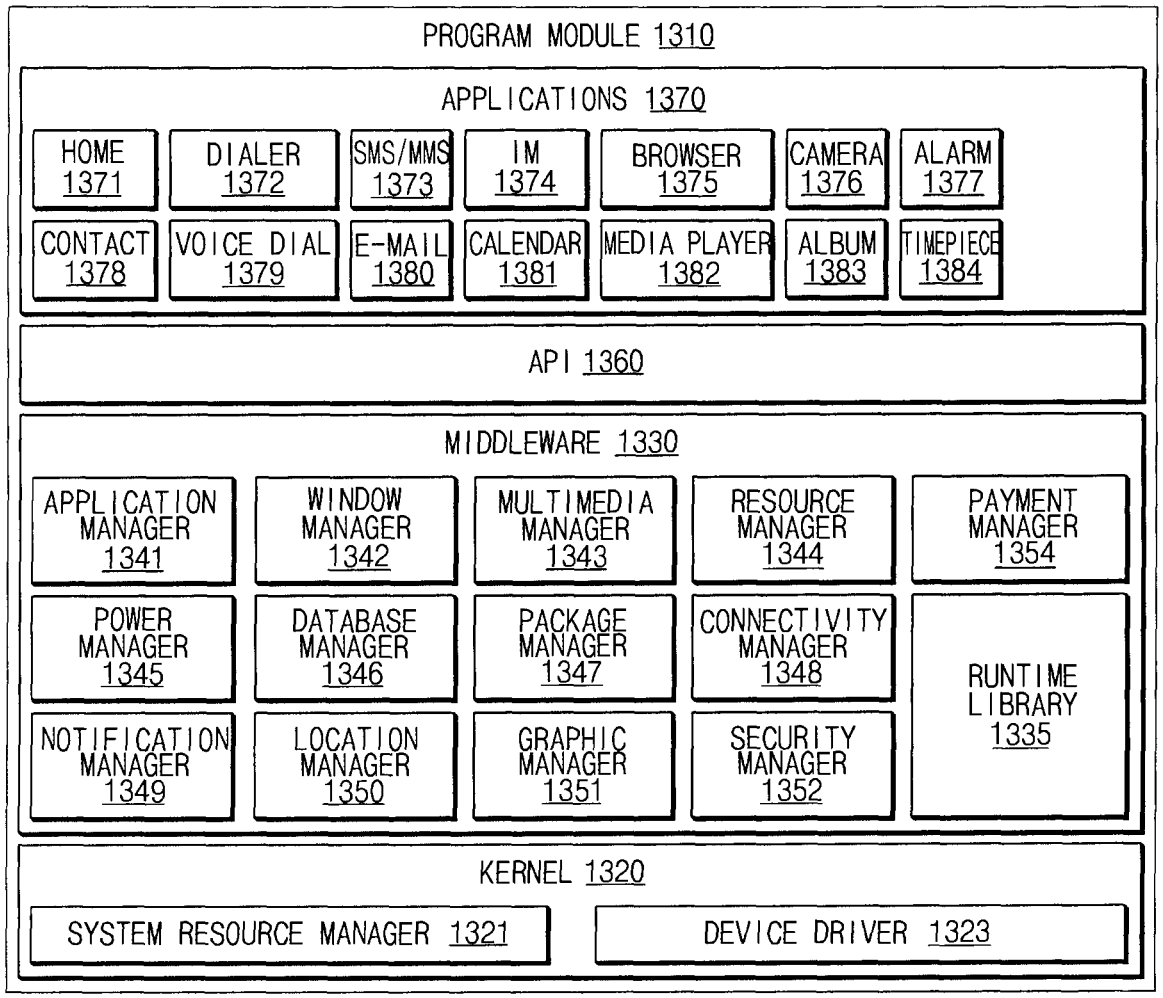
FIG. 13 illustrates a block diagram of a program module, according to an embodiment.

FIG. 13 illustrates a block diagram of a program module, according to various embodiments.

According to an embodiment, a program module 1310 (e.g., the program 1140) may include an operating system (OS) to control resources associated with an electronic device (e.g., the electronic device 1101), and/or diverse applications (e.g., the application program 1147) driven on the OS. The OS may be, for example, Android™, iOS™, Windows™, Symbian™, or Tizen™.

The program module 1310 may include a kernel 1320, a middleware 1330, an application programming interface (API) 1360, and/or an application 1370. At least a portion of the program module 1310 may be preloaded on an electronic device or may be downloadable from an external electronic device (e.g., the first electronic device 1102, the second electronic device 1104, the server 1106, or the like).

The kernel 1320 (e.g., the kernel 1141) may include, for example, a system resource manager 1321 or a device driver 1323. The system resource manager 1321 may perform control, allocation, or retrieval of system resources. According to an embodiment, the system resource manager 1321 may include a process managing unit, a memory managing unit, or a file system managing unit. The device driver 1323 may include, for example, a display driver, a camera driver, a Bluetooth driver, a shared memory driver, a USB driver, a keypad driver, a Wi-Fi driver, an audio driver, or an inter-process communication (IPC) driver.

The middleware 1330 may provide, for example, a function that the application 1370 needs in common, or may provide diverse functions to the application 1370 through the API 1360 to allow the application 1370 to efficiently use limited system resources of the electronic device. According to an embodiment, the middleware 1330 (e.g., the middleware 1143) may include at least one of a runtime library 1335, an application manager 1341, a window manager 1342, a multimedia manager 1343, a resource manager 1344, a power manager 1345, a database manager 1346, a package manager 1347, a connectivity manager 1348, a notification manager 1349, a location manager 1350, a graphic manager 1351, a security manager 1352, or a payment manager 1354.

The runtime library 1335 may include, for example, a library module that is used by a compiler to add a new function through a programming language while the application 1370 is being executed. The runtime library 1335 may perform input/output management, memory management, or capacities about arithmetic functions.

The application manager 1341 may manage, for example, a life cycle of at least one application of the application 1370. The window manager 1342 may manage a graphic user interface (GUI) resource that is used in a screen. The multimedia manager 1343 may identify a format necessary for playing diverse media files, and may perform encoding or decoding of media files by using a codec suitable for the format. The resource manager 1344 may manage resources such as a storage space, memory, or source code of at least one application of the application 1370.

The power manager 1345 may operate, for example, with a basic input/output system (BIOS) to manage a battery or power, and may provide power information for an operation of an electronic device. The database manager 1346 may generate, search for, or modify database that is to be used in at least one application of the application 1370. The package manager 1347 may install or update an application that is distributed in the form of package file.

The connectivity manager 1348 may manage, for example, wireless connection such as Wi-Fi or Bluetooth. The notification manager 1349 may display or notify an event such as arrival message, appointment, or proximity notification in a mode that does not disturb a user. The location manager 1350 may manage location information about an electronic device. The graphic manager 1351 may manage a graphic effect that is provided to a user, or manage a user interface relevant thereto. The security manager 1352 may provide a general security function necessary for system security, user authentication, or the like. According to an embodiment, in the case where an electronic device (e.g., the electronic device 1101) includes a telephony function, the middleware 1330 may further include a telephony manager for managing a voice or video call function of the electronic device.

The middleware 1330 may include a middleware module that combines diverse functions of the above-described components. The middleware 1330 may provide a module specialized to each OS kind to provide differentiated functions. Additionally, the middleware 1330 may dynamically remove a part of the preexisting components or may add new components thereto.

The API 1360 (e.g., the API 1145) may be, for example, a set of programming functions and may be provided with a configuration that is variable depending on an OS. For example, in the case where an OS is Android™ or iOS™, it may provide one API set per platform. In the case where an OS is Tizen™, it may provide two or more API sets per platform.

The application 1370 (e.g., the application program 1147) may include, for example, one or more applications capable of providing functions for a home 1371, a dialer 1372, an SMS/MMS 1373, an instant message (IM) 1374, a browser 1375, a camera 1376, an alarm 1377, a contact 1378, a voice dial 1379, an e-mail 1380, a calendar 1381, a media player 1382, an album 1383, or a timepiece 1384 or for offering health care (e.g., measuring an exercise quantity, blood sugar, or the like) or environment information (e.g., information of barometric pressure, humidity, temperature, or the like).

According to an embodiment, the application 1370 may include an application (hereinafter referred to as "information exchanging application" for descriptive convenience) to support information exchange between an electronic device (e.g., the electronic device 1101) and an external electronic device (e.g., the first electronic device 1102 or the second electronic device 1104). The information exchanging application may include, for example, a notification relay application for transmitting specific information to an external electronic device, or a device management application for managing the external electronic device.

For example, the notification relay application may include a function of transmitting notification information, which arise from other applications (e.g., applications for SMS/MMS, e-mail, health care, or environmental information), to an external electronic device. Additionally, the notification relay application may receive, for example, notification information from an external electronic device and provide the notification information to a user.

The device management application may manage (e.g., install, delete, or update), for example, at least one function (e.g., turn-on/turn-off of an external electronic device itself (or a part) or adjustment of brightness (or resolution) of a display) of the external electronic device which communicates with the electronic device, an application running in the external electronic device, or a service (e.g., a call service, a message service, or the like) provided from the external electronic device.

According to an embodiment, the application 1370 may include an application (e.g., a health care application of a mobile medical device) that is assigned in accordance with an attribute of an external electronic device. According to an embodiment, the application 1370 may include an application that is received from an external electronic device (e.g., the first electronic device 1102, the second electronic device 1104, or the server 1106). According to an embodiment, the application 1370 may include a preloaded application or a third party application that is downloadable from a server. The names of components of the program module 1310 according to the embodiment may be modifiable depending on kinds of operating systems.

According to various embodiments, at least a portion of the program module 1310 may be implemented by software, firmware, hardware, or a combination of two or more thereof. At least a portion of the program module 1310 may be implemented (e.g., executed), for example, by the processor (e.g., the processor 1210). At least a portion of the program module 1310 may include, for example, modules, programs, routines, sets of instructions, processes, or the like for performing one or more functions.

The term "module" used in the present disclosure may represent, for example, a unit including one or more combinations of hardware, software and firmware. The term "module" may be interchangeably used with the terms "unit", "logic", "logical block", "part" and "circuit". The "module" may be a minimum unit of an integrated part or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

At least a part of an apparatus (e.g., modules or functions thereof) or a method (e.g., operations) according to various embodiments may be, for example, implemented by instructions stored in a computer-readable storage media in the form of a program module. The instruction, when executed by a processor (e.g., the processor 1120), may cause the one or more processors to perform a function corresponding to the instruction. The computer-readable storage media, for example, may be the memory 1130.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and hardware devices (e.g., a read only memory (ROM), a random access memory (RAM), or a flash memory). Also, the one or more instructions may contain a code made by a compiler or a code executable by an interpreter. The above hardware unit may be configured to operate via one or more software modules for performing an operation according to various embodiments, and vice versa.

A module or a program module according to various embodiments may include at least one of the above components, or a part of the above components may be omitted, or additional other components may be further included. Operations performed by a module, a program module, or other components according to various embodiments may be executed sequentially, in parallel, repeatedly, or in a heuristic method. In addition, some operations may be executed in different sequences or may be omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. An electronic device comprising:
   a housing;
   a display exposed through a portion of the housing;
   a camera device disposed at another portion of the housing;
   a wireless communication circuit included in the housing;
   a processor disposed in the housing and electrically connected with the display, the camera device, and the wireless communication circuit; and
   a memory provided in the housing and electrically connected with the processor,
   wherein the memory is configured to store a plurality of images obtained through the camera device or the wireless communication circuit, and
   wherein the memory stores instructions that, when executed, cause the processor to:
   perform image recognition for the plurality of images;
   calculate similarity between the plurality of images, based on a result of the image recognition;
   create a group including at least two images of the plurality of images, based on the calculated similarity;
   determine a sequence of outputting the at least two images included in the group and a time interval for transitioning the at least two images based on similarity between the at least two images included in the group; and
   output the at least two images to the display in the sequence based on the time interval.

2. The electronic device of claim 1, wherein the instructions cause, when executed, the processor to:
   create a continuous image file including the at least two images, in the sequence, after determining the sequence.

3. The electronic device of claim 1, wherein the instructions cause, when executed, the processor to:
   perform the image recognition by extracting a feature vector from the plurality of images.

4. The electronic device of claim 1, wherein the instructions cause, when executed, the processor to:
   create an additional image by changing at least a portion of the at least two images arranged in the sequence.

5. The electronic device of claim 4, wherein the instructions cause, when executed, the processor to:
   output the additional image, to the display, by inserting the additional image between the at least two images.

6. The electronic device of claim 1, wherein the instructions cause, when executed, the processor to:
   output the at least two images to the display by deleting or adding at least a portion of the at least two images arranged in the sequence.

7. The electronic device of claim 1, wherein the sequence is different from a sequence of times included in metadata of the images.

8. The electronic device of claim 1, wherein the processor forms a portion of a photo application of the instructions.

9. A method comprising:
   performing image recognition for a plurality of images;
   calculating similarity between the plurality of images, based on a result of the image recognition;
   creating a group including at least two images of the plurality of images, based on the calculated similarity;

determining a sequence of outputting the at least two images included in the group and a time interval for transitioning the at least two images based on the similarity between the at least two images included in the group; and outputting the at least two images to a display, in the sequence based on the time interval.

10. The method of claim 9, further comprising:
creating a continuous image file including the at least two images, in the sequence, after determining the sequence.

11. The method of claim 9, wherein the performing of the image recognition for the plurality of images includes:
extracting a feature vector from the plurality of images.

12. The method of claim 9, wherein the outputting of the at least two images to the display, in the sequence includes:
creating an additional image by changing at least a portion of the at least two images arranged in the sequence.

13. The method of claim 12, wherein the outputting of the at least two images to the display in the sequence includes:
outputting the additional image to the display, by inserting the additional image between the at least two images.

14. The method of claim 9, wherein the outputting of the at least two images to the display in the sequence includes:
outputting the at least two images to the display by deleting or adding at least a portion of the at least two images arranged in the sequence.

15. The method of claim 9, wherein the determining of the sequence for displaying includes:
determining the sequence for the displaying, which is different ferom a sequence of times included in metadata of the images.

* * * * *